US011279469B2

(12) United States Patent
Petscher et al.

(10) Patent No.: US 11,279,469 B2
(45) Date of Patent: Mar. 22, 2022

(54) AIRPLANE WING

(71) Applicant: The Aircraft Performance Company GmbH, Hamburg (DE)

(72) Inventors: Hans-Jorg Petscher, Hamburg (DE); Volker Kassera, Starzach-Sulzau (DE)

(73) Assignee: The Aircraft Performance Company GmbH, Hamburg (DE)

( * ) Notice: Subject to any disclaimer, the term of this patent is extended or adjusted under 35 U.S.C. 154(b) by 413 days.

(21) Appl. No.: 16/317,273

(22) PCT Filed: Jul. 12, 2017

(86) PCT No.: PCT/EP2017/025204
§ 371 (c)(1),
(2) Date: Jan. 11, 2019

(87) PCT Pub. No.: WO2018/010850
PCT Pub. Date: Jan. 18, 2018

(65) Prior Publication Data
US 2019/0248476 A1 Aug. 15, 2019

(30) Foreign Application Priority Data

Jul. 12, 2016 (EP) .................................... 16020266
Nov. 11, 2016 (EP) .................................... 16020445

(51) Int. Cl.
*B64C 23/06* (2006.01)
*B64C 3/10* (2006.01)

(52) U.S. Cl.
CPC .......... *B64C 23/069* (2017.05); *B64C 23/065* (2013.01); *B64C 3/10* (2013.01); *Y02T 50/10* (2013.01)

(58) Field of Classification Search
CPC ....... B64C 23/065; B64C 23/069; B64C 3/10; B64C 23/076; B64C 23/072; Y02T 50/10
See application file for complete search history.

(56) References Cited

U.S. PATENT DOCUMENTS

| 994,968 | A | * | 6/1911 | Barbaudy | ................. | B64C 3/14 |
| | | | | | | 244/35 R |
| 1,050,222 | A | * | 1/1913 | McIntosh | ................. | B64C 3/14 |
| | | | | | | 244/35 R |

(Continued)

FOREIGN PATENT DOCUMENTS

| CA | 2643071 A1 | 8/2007 |
| CN | 206050054 U | 3/2017 |

(Continued)

OTHER PUBLICATIONS

R.Cosin et al: "Aerodynamic Analysis of Multi-Winglets for Low Speed Aircraft" www.icas.org/icas_archive/icas2010/papers/067; Jan. 1, 2010.

(Continued)

*Primary Examiner* — Medhat Badawi
(74) *Attorney, Agent, or Firm* — Howard IP Law Group, P.C.

(57) ABSTRACT

The invention relates to a wing with two winglets (9-12) and a respective airplane. An upstream winglet (9, 11) broadens a region of inclined airflow and a downstream winglet (10, 12) produces a thrust contribution therein.

14 Claims, 25 Drawing Sheets

(56) References Cited

U.S. PATENT DOCUMENTS

| | | | | |
|---|---|---|---|---|
| 1,466,551 A | * | 8/1923 | Thurston | B64C 23/076 244/218 |
| 1,692,081 A | * | 11/1928 | De La Cierva | B64C 27/023 416/131 |
| 1,710,673 A | * | 4/1929 | Bonney | B64C 3/44 244/215 |
| 1,841,921 A | * | 1/1932 | Spiegel | B64C 23/069 244/199.4 |
| 1,888,418 A | * | 11/1932 | Adams | B64C 23/076 244/218 |
| 2,123,096 A | * | 7/1938 | Charpentier | B64C 3/10 244/35 R |
| 2,164,721 A | * | 7/1939 | Price | B64C 21/025 244/208 |
| 2,576,981 A | * | 12/1951 | Vogt | B64C 23/069 244/91 |
| 2,743,888 A | * | 5/1956 | Lippisch | B64C 23/076 244/199.4 |
| 2,775,419 A | * | 12/1956 | Hlobil | B64C 39/10 244/35 R |
| 2,805,830 A | * | 9/1957 | Von Zborowski | B64C 29/0091 244/35 R |
| 2,846,165 A | * | 8/1958 | Axelson | B64C 5/08 244/90 R |
| 3,027,118 A | * | 3/1962 | Willox | B64C 30/00 244/15 |
| 3,029,018 A | * | 4/1962 | Floyd, Jr. | G06G 7/46 703/9 |
| 3,128,371 A | * | 4/1964 | Spaulding | G06G 7/44 205/775 |
| 3,270,988 A | * | 9/1966 | Cone, Jr. | B64C 23/069 244/35 R |
| 3,684,217 A | * | 8/1972 | Kukon | B64B 1/00 244/36 |
| 3,712,564 A | * | 1/1973 | Rethorst | B64C 23/06 244/199.4 |
| 3,778,926 A | * | 12/1973 | Gladych | A63H 27/00 446/66 |
| 3,840,199 A | * | 10/1974 | Tibbs | B64C 23/005 244/207 |
| 4,017,041 A | * | 4/1977 | Nelson | B64C 23/072 244/198 |
| 4,046,336 A | * | 9/1977 | Tangler | B64C 23/069 244/198 |
| 4,093,160 A | * | 6/1978 | Reighart, II | B64C 23/06 244/199.1 |
| 4,108,403 A | * | 8/1978 | Finch | B64C 23/065 244/199.2 |
| 4,172,574 A | * | 10/1979 | Spillman | B64C 23/072 244/199.4 |
| 4,190,219 A | * | 2/1980 | Hackett | B64C 23/069 244/199.4 |
| 4,205,810 A | * | 6/1980 | Ishimitsu | B64C 23/069 244/91 |
| 4,240,597 A | * | 12/1980 | Ellis | B64C 23/069 244/35 R |
| 4,245,804 A | * | 1/1981 | Ishimitsu | B64C 23/069 244/91 |
| 4,247,062 A | * | 1/1981 | Brueckner | B64C 5/08 244/36 |
| 4,247,063 A | * | 1/1981 | Jenkins | B64C 5/08 244/91 |
| D259,554 S | * | 6/1981 | Parise | 244/199.4 |
| 4,365,773 A | * | 12/1982 | Wolkovitch | B64C 39/068 244/123.7 |
| 4,382,569 A | * | 5/1983 | Boppe | B64C 23/069 244/199.4 |
| 4,429,844 A | * | 2/1984 | Brown | B64C 3/48 244/219 |
| 4,444,365 A | * | 4/1984 | Heuberger | F16C 23/10 244/48 |
| 4,449,680 A | * | 5/1984 | Gratzer | B64D 29/02 244/130 |
| 4,449,681 A | * | 5/1984 | Gratzer | B64D 29/02 244/130 |
| 4,449,682 A | * | 5/1984 | Gratzer | B64D 29/02 244/130 |
| 4,449,683 A | * | 5/1984 | Gratzer | B64D 29/02 244/130 |
| 4,455,004 A | * | 6/1984 | Whitaker, Sr. | B64C 23/076 244/90 R |
| 4,457,479 A | * | 7/1984 | Daude | B64C 5/08 244/203 |
| 4,541,593 A | * | 9/1985 | Cabrol | B64C 39/068 244/45 R |
| 4,545,552 A | * | 10/1985 | Welles | B64C 39/10 244/90 R |
| 4,575,030 A | * | 3/1986 | Gratzer | B64C 21/06 244/209 |
| 4,595,160 A | * | 6/1986 | Santos | B64C 23/069 244/199.4 |
| 4,598,885 A | * | 7/1986 | Waitzman | B64C 23/076 244/13 |
| 4,605,183 A | * | 8/1986 | Gabriel | B64C 3/40 244/46 |
| 4,667,906 A | * | 5/1987 | Suárez | B64C 3/28 244/117 A |
| 4,671,473 A | * | 6/1987 | Goodson | B64C 23/076 244/199.4 |
| 4,674,709 A | * | 6/1987 | Welles | B64C 39/10 244/45 R |
| 4,700,911 A | * | 10/1987 | Zimmer | B64C 3/10 244/35 R |
| 4,706,902 A | * | 11/1987 | Destuynder | B64C 13/16 244/76 C |
| 4,714,215 A | * | 12/1987 | Jupp | B64C 23/069 244/199.4 |
| 4,722,499 A | * | 2/1988 | Klug | B64C 23/076 244/199.4 |
| 4,776,542 A | * | 10/1988 | Van Dam | B64C 3/10 244/198 |
| 4,813,631 A | * | 3/1989 | Gratzer | B64C 21/06 244/35 R |
| 4,949,919 A | * | 8/1990 | Wajnikonis | B64C 3/10 244/35 R |
| 5,039,032 A | * | 8/1991 | Rudolph | B64C 23/069 244/35 R |
| 5,082,204 A | * | 1/1992 | Croston | B64C 39/10 244/126 |
| 5,096,382 A | * | 3/1992 | Gratzer | B63H 1/16 416/189 |
| 5,102,068 A | * | 4/1992 | Gratzer | B64C 23/069 244/35 R |
| 5,156,358 A | * | 10/1992 | Gerhardt | B64C 5/10 244/36 |
| 5,174,721 A | * | 12/1992 | Brocklehurst | B64C 27/463 416/223 R |
| 5,190,441 A | * | 3/1993 | Murphy | F02K 3/072 416/129 |
| 5,275,358 A | * | 1/1994 | Goldhammer | B64C 23/069 244/91 |
| 5,348,253 A | * | 9/1994 | Gratzer | B64C 23/069 244/91 |
| 5,381,986 A | * | 1/1995 | Smith | B64C 3/56 244/49 |
| 5,407,153 A | * | 4/1995 | Kirk | B64C 23/069 244/199.4 |
| 5,634,613 A | * | 6/1997 | McCarthy | B64C 23/069 244/199.1 |
| 5,778,191 A | * | 7/1998 | Levine | H04N 19/00 375/E7.222 |
| 5,823,480 A | * | 10/1998 | La Roche | B64C 23/076 244/199.4 |
| 5,909,858 A | * | 6/1999 | Hawley | B64C 39/10 244/36 |
| 5,961,068 A | * | 10/1999 | Wainfan | B64C 5/02 244/36 |

(56) References Cited

U.S. PATENT DOCUMENTS

| | | | | |
|---|---|---|---|---|
| 5,975,464 | A * | 11/1999 | Rutan | B64C 39/02 244/118.2 |
| 5,988,563 | A * | 11/1999 | Allen | B64C 3/56 244/49 |
| 5,992,793 | A * | 11/1999 | Perry | B64C 27/463 244/17.11 |
| 6,015,115 | A * | 1/2000 | Dorsett | B64C 3/46 244/123.11 |
| 6,089,502 | A * | 7/2000 | Herrick | B64C 23/069 244/35 R |
| 6,161,797 | A * | 12/2000 | Kirk | B64D 33/06 244/1 N |
| 6,161,801 | A * | 12/2000 | Kelm | B64C 13/16 244/76 C |
| 6,227,487 | B1 * | 5/2001 | Clark | B64C 23/072 244/99.12 |
| 6,231,308 | B1 * | 5/2001 | Kondo | B64C 27/463 416/228 |
| 6,260,809 | B1 * | 7/2001 | Egolf | B64C 27/463 244/17.11 |
| 6,345,790 | B1 * | 2/2002 | Brix | B64C 23/076 244/199.4 |
| 6,375,126 | B1 * | 4/2002 | Sakurai | B64C 3/50 244/214 |
| 6,394,397 | B1 * | 5/2002 | Ngo | B64C 27/463 244/199.3 |
| 6,467,732 | B2 * | 10/2002 | Tsukahara | B64C 27/463 244/17.11 |
| 6,474,604 | B1 * | 11/2002 | Carlow | B64C 39/062 244/198 |
| 6,547,181 | B1 * | 4/2003 | Hoisington | B60V 1/08 244/46 |
| 6,578,798 | B1 * | 6/2003 | Dizdarevic | B64C 23/069 244/199.1 |
| 6,622,974 | B1 * | 9/2003 | Dockter | B64C 3/48 244/218 |
| 6,726,149 | B2 * | 4/2004 | Wojciechowski | B64C 3/00 244/119 |
| 6,743,504 | B1 * | 6/2004 | Allen | B29C 70/446 428/362 |
| 6,772,979 | B2 * | 8/2004 | Kubica | B64C 13/16 244/195 |
| 6,796,534 | B2 * | 9/2004 | Beyer | B64C 3/48 244/214 |
| 6,827,314 | B2 * | 12/2004 | Barriety | B64C 3/52 244/201 |
| 6,910,661 | B2 * | 6/2005 | Dockter | B64C 3/54 244/218 |
| 6,926,345 | B2 * | 8/2005 | Ortega | B62D 35/008 296/180.4 |
| 7,028,948 | B2 | 4/2006 | Pitt | |
| 7,048,228 | B2 * | 5/2006 | Vassberg | B64C 3/28 244/35 R |
| 7,475,848 | B2 * | 1/2009 | Morgenstern | B64C 23/04 244/35 R |
| D595,211 | S * | 6/2009 | Cazals | D12/345 |
| 7,597,285 | B2 * | 10/2009 | Schweiger | B64C 27/615 244/75.1 |
| 7,644,892 | B1 * | 1/2010 | Alford, Jr | B64C 23/065 244/199.4 |
| 7,744,038 | B2 | 6/2010 | Sankrithi et al. | |
| 7,789,343 | B2 * | 9/2010 | Sarh | B64C 3/54 244/46 |
| 7,798,443 | B2 * | 9/2010 | Hamilton | B64C 3/38 244/99.8 |
| 7,900,877 | B1 * | 3/2011 | Guida | B64C 23/065 244/199.4 |
| 7,980,515 | B2 * | 7/2011 | Hunter | B64C 23/069 244/198 |
| 7,988,099 | B2 * | 8/2011 | Bray | B64C 13/16 244/199.4 |
| 7,997,875 | B2 * | 8/2011 | Nanukuttan | F03D 1/065 416/237 |
| 8,083,185 | B2 * | 12/2011 | Konings | B64C 5/08 244/199.4 |
| 8,123,160 | B2 * | 2/2012 | Shepshelovich | B64C 39/028 244/45 R |
| 8,128,035 | B2 | 3/2012 | Malachowski et al. | |
| 8,241,002 | B2 * | 8/2012 | Wobben | F03D 1/0675 416/228 |
| 8,256,719 | B2 * | 9/2012 | Wood | B64C 3/48 244/200 |
| 8,333,348 | B1 * | 12/2012 | Miller | B64C 13/16 244/199.4 |
| 8,336,830 | B2 * | 12/2012 | Eberhardt | B64C 3/54 244/218 |
| 8,342,447 | B2 * | 1/2013 | Etling | B64C 9/00 244/90 R |
| 8,366,056 | B2 | 2/2013 | Garang | |
| 8,366,057 | B2 * | 2/2013 | Vos | B64C 3/46 244/219 |
| 8,382,041 | B1 * | 2/2013 | Yechout | B64C 23/069 244/199.4 |
| 8,444,389 | B1 * | 5/2013 | Jones | F01D 5/14 416/193 A |
| 8,651,427 | B1 * | 2/2014 | Malachowski | B64C 23/065 244/199.4 |
| D716,978 | S * | 11/2014 | Selvaag | D26/28 |
| 8,894,018 | B2 * | 11/2014 | Boer | B64C 23/072 244/199.4 |
| 8,925,870 | B1 * | 1/2015 | Gordon | B64C 3/28 244/200 |
| 8,936,219 | B2 | 1/2015 | Roman et al. | |
| 9,469,391 | B1 * | 10/2016 | Dong | B64C 23/076 |
| 9,505,484 | B1 * | 11/2016 | Al-Sabah | B64C 13/20 |
| 9,517,834 | B2 * | 12/2016 | Thompson | B64C 3/56 |
| 9,623,960 | B2 * | 4/2017 | Devenyi | B64C 23/069 |
| 9,669,944 | B2 * | 6/2017 | Gagnon | B64D 47/02 |
| 9,738,375 | B2 * | 8/2017 | Witte | B29C 70/44 |
| 9,751,638 | B1 * | 9/2017 | Gagnon | B64D 47/04 |
| 2001/0032907 | A1 * | 10/2001 | Borchers | B64C 23/06 244/199.1 |
| 2002/0060272 | A1 * | 5/2002 | La Roche | B64C 23/06 244/199.1 |
| 2002/0092947 | A1 * | 7/2002 | Felker | B64C 23/069 244/35 R |
| 2002/0162917 | A1 * | 11/2002 | Heller | B64C 3/10 244/199.4 |
| 2003/0106961 | A1 * | 6/2003 | Wyrembek | B64C 23/076 244/113 |
| 2004/0262451 | A1 * | 12/2004 | McLean | B64C 3/10 244/45 R |
| 2005/0013694 | A1 * | 1/2005 | Kovalsky | B64C 27/46 416/226 |
| 2005/0045765 | A1 * | 3/2005 | Pitt | B64C 3/40 244/46 |
| 2005/0133672 | A1 * | 6/2005 | Irving | B64C 23/072 244/201 |
| 2005/0173592 | A1 * | 8/2005 | Houck, II | B64C 3/16 244/45 R |
| 2005/0184196 | A1 * | 8/2005 | Shmilovich | B64C 23/065 244/199.3 |
| 2006/0027703 | A1 * | 2/2006 | Bussom | B64C 27/463 244/17.13 |
| 2006/0118675 | A1 * | 6/2006 | Tidwell | B64C 3/40 244/123.1 |
| 2006/0144992 | A1 * | 7/2006 | Jha | B64C 3/40 244/46 |
| 2007/0018037 | A1 * | 1/2007 | Perlo | B64C 39/08 244/45 R |
| 2007/0018049 | A1 * | 1/2007 | Stuhr | B64C 23/069 244/124 |
| 2007/0114327 | A1 * | 5/2007 | Dees | B64C 13/16 244/34 R |
| 2007/0131821 | A1 * | 6/2007 | Johan | B64C 5/08 244/91 |

(56) References Cited

U.S. PATENT DOCUMENTS

| | | | |
|---|---|---|---|
| 2007/0252031 A1* | 11/2007 | Hackett | B64C 27/463 244/4 R |
| 2007/0262205 A1* | 11/2007 | Grant | B64C 23/072 244/199.2 |
| 2008/0116322 A1* | 5/2008 | May | B64C 23/076 244/199.4 |
| 2008/0145219 A1* | 6/2008 | McVeigh | F03D 1/0675 416/23 |
| 2008/0191099 A1* | 8/2008 | Werthmann | B64C 23/065 244/199.4 |
| 2008/0223991 A1* | 9/2008 | Mann | B64C 23/069 244/199.4 |
| 2008/0308683 A1* | 12/2008 | Sankrithi | B64C 23/076 244/199.4 |
| 2009/0014596 A1* | 1/2009 | Pearson | B64C 39/024 244/34 R |
| 2009/0039204 A1* | 2/2009 | Eberhardt | B64C 23/069 244/199.4 |
| 2009/0065632 A1* | 3/2009 | Cazals | B64D 27/16 244/15 |
| 2009/0084904 A1* | 4/2009 | Detert | B64C 23/065 244/199.4 |
| 2009/0127861 A1* | 5/2009 | Sankrithi | F03B 13/264 290/54 |
| 2009/0148301 A1* | 6/2009 | Leahy | B64C 27/473 416/223 R |
| 2009/0194638 A1* | 8/2009 | Dennis | B64C 23/069 244/131 |
| 2009/0224107 A1* | 9/2009 | McLean | B64C 23/069 244/199.4 |
| 2009/0230240 A1* | 9/2009 | Osborne | B64C 9/34 244/87 |
| 2009/0232040 A1* | 9/2009 | Abdel-Kader | H04W 48/16 370/311 |
| 2009/0256029 A1* | 10/2009 | Malachowski | B64C 23/069 244/199.4 |
| 2009/0269205 A1* | 10/2009 | Leahy | B64C 27/473 416/226 |
| 2009/0283639 A1* | 11/2009 | Ackermann | B64C 3/18 244/131 |
| 2009/0302167 A1* | 12/2009 | Desroche | B64C 9/18 244/199.4 |
| 2010/0006706 A1* | 1/2010 | Breitsamter | B64C 23/076 244/199.3 |
| 2010/0012773 A1* | 1/2010 | Im | B64C 3/10 244/36 |
| 2010/0019094 A1* | 1/2010 | Theurich | B64C 23/069 244/199.4 |
| 2010/0044501 A1* | 2/2010 | Silich | B64C 15/14 244/52 |
| 2010/0123047 A1* | 5/2010 | Williams | B64C 39/028 244/35 R |
| 2010/0155541 A1* | 6/2010 | Garang | B64C 23/065 244/199.4 |
| 2010/0163670 A1* | 7/2010 | Dizdarevic | B64C 1/0009 244/36 |
| 2010/0181432 A1* | 7/2010 | Gratzer | B64C 11/18 244/199.4 |
| 2010/0266413 A1* | 10/2010 | Naumenko | F03D 3/065 416/203 |
| 2011/0006165 A1* | 1/2011 | Ireland | B64C 23/06 244/200.1 |
| 2011/0024556 A1* | 2/2011 | Cazals | B64C 23/076 244/99.12 |
| 2011/0031354 A1* | 2/2011 | Kelleher | B64C 39/024 244/45 R |
| 2011/0042524 A1* | 2/2011 | Hemmelgarn | B64C 3/48 244/203 |
| 2011/0084174 A1* | 4/2011 | Hemmelgarn | B64C 3/48 244/200 |
| 2011/0095128 A1* | 4/2011 | Schwarze | B64C 5/06 244/87 |
| 2011/0101169 A1* | 5/2011 | Schaber | B64C 23/065 244/199.3 |
| 2011/0192937 A1* | 8/2011 | Buescher | B64C 23/069 244/199.4 |
| 2011/0260008 A1* | 10/2011 | Smith | F03D 1/065 244/199.4 |
| 2012/0027594 A1* | 2/2012 | Lewke | F03D 1/0608 416/146 R |
| 2012/0049010 A1* | 3/2012 | Speer | B64C 23/065 244/45 R |
| 2012/0091262 A1* | 4/2012 | Rawdon | B64C 23/069 244/36 |
| 2012/0104181 A1* | 5/2012 | Rix | B64C 3/48 244/219 |
| 2012/0112005 A1* | 5/2012 | Chaussee | B64C 23/072 244/123.1 |
| 2012/0185181 A1* | 7/2012 | Chankaya | B64C 23/076 702/41 |
| 2012/0187251 A1* | 7/2012 | Guida | B64C 23/076 244/199.4 |
| 2012/0286102 A1* | 11/2012 | Sinha | B64C 29/0025 244/7 B |
| 2012/0286122 A1* | 11/2012 | Tankielun | G01R 29/0864 248/346.06 |
| 2012/0312928 A1* | 12/2012 | Gratzer | B64C 23/065 244/199.4 |
| 2013/0092797 A1* | 4/2013 | Wright | B64C 3/58 244/199.4 |
| 2013/0256460 A1* | 10/2013 | Roman | B64C 3/58 244/199.4 |
| 2014/0014768 A1* | 1/2014 | Lassen | B64C 3/56 244/49 |
| 2014/0117166 A1* | 5/2014 | Campbell, Jr. | B64C 23/069 244/199.4 |
| 2014/0159965 A1* | 6/2014 | Le | H01Q 1/283 343/705 |
| 2014/0306067 A1* | 10/2014 | Guida | B64C 23/076 244/199.4 |
| 2014/0328694 A1* | 11/2014 | Campbell, Jr. | B64C 23/065 416/241 R |
| 2014/0346281 A1* | 11/2014 | Gratzer | B64C 23/069 244/199.4 |
| 2015/0014478 A1* | 1/2015 | Lassen | B64C 3/56 244/49 |
| 2015/0028151 A1* | 1/2015 | Bevirt | B64D 27/24 244/6 |
| 2015/0041597 A1* | 2/2015 | Theurich | B64C 23/069 244/199.4 |
| 2015/0108283 A1* | 4/2015 | Thoreen | B64C 9/00 244/234 |
| 2015/0203190 A1* | 7/2015 | Witte | B64C 5/08 244/199.4 |
| 2016/0009379 A1* | 1/2016 | Witte | B64C 5/08 244/1 A |
| 2016/0039379 A1* | 2/2016 | Saitoh | B60R 19/483 293/117 |
| 2016/0075429 A1* | 3/2016 | Fong | B64F 5/10 244/199.4 |
| 2016/0130012 A1* | 5/2016 | Laguia-Barnola | B64C 23/069 705/26.7 |
| 2016/0144969 A1* | 5/2016 | Rawdon | B64C 23/069 244/13 |
| 2016/0244146 A1* | 8/2016 | Harding | B64C 3/56 |
| 2017/0050723 A1* | 2/2017 | Witte | B64F 5/10 |
| 2017/0137116 A1* | 5/2017 | Ireland | F04D 29/324 |
| 2017/0233065 A1* | 8/2017 | Swanson | B64C 23/069 244/199.4 |
| 2017/0247105 A1* | 8/2017 | Heller | B64C 23/065 |
| 2017/0253322 A1* | 9/2017 | Krebs | B64C 23/065 |
| 2017/0260966 A1* | 9/2017 | Gratzer | F03D 7/06 |
| 2017/0341728 A1* | 11/2017 | Moore | B64F 5/10 |
| 2018/0043985 A1* | 2/2018 | Thompson | B64C 23/072 |
| 2018/0050790 A1* | 2/2018 | Whitehouse | B64C 23/069 |
| 2018/0237128 A1* | 8/2018 | Commis | B64C 23/065 |
| 2018/0319484 A1* | 11/2018 | Gratzer | B64C 23/065 |
| 2018/0334253 A1* | 11/2018 | Geneste | B64C 3/10 |

(56) References Cited

U.S. PATENT DOCUMENTS

| | | | |
|---|---|---|---|
| 2019/0248476 A1* | 8/2019 | Petscher | ............... B64C 23/065 |
| 2020/0247525 A1* | 8/2020 | Manterola Ottonello | ................... B64D 27/02 |
| 2020/0339249 A1* | 10/2020 | Petscher | ............... B64C 23/069 |
| 2020/0398972 A1* | 12/2020 | Petscher | ................... B64C 3/10 |

FOREIGN PATENT DOCUMENTS

| | | | |
|---|---|---|---|
| DE | 2149956 | A1 | 4/1973 |
| DE | 19706668 | A1 | 9/1998 |
| DE | 102004019576 | A1 | 11/2005 |
| DE | 202014104042 | U1 | 9/2015 |
| EP | 0878394 | A1 | 5/1997 |
| EP | 1127786 | A1 | 2/2000 |
| EP | 1149761 | A1 | 10/2001 |
| EP | 1205384 | A2 | 5/2002 |
| EP | 1531126 | A1 | 1/2005 |
| EP | 2930103 | A1 | 10/2015 |
| EP | 2955102 | A1 | 12/2015 |
| EP | 3034396 | A1 | 2/2016 |
| EP | 2998218 | A1 | 3/2016 |
| EP | 3269635 | A1 | 1/2018 |
| EP | 3269636 | A1 | 1/2018 |
| JP | 20162790 | A | 1/2016 |
| SU | 2118270 | C1 | 8/1988 |
| WO | 2007095931 | A2 | 8/2007 |
| WO | 2009149932 | A2 | 12/2009 |
| WO | 2017081402 | A1 | 5/2017 |
| WO | 2018010850 | A1 | 1/2018 |

OTHER PUBLICATIONS

International Search Report dated Oct. 12, 2017 for related PCT Application No. PCT/EP2017/025204.

Annex to European Search Report dated May 23, 2018 for related EP Application No. EP 17 020 576.

Pages from European Search Report dated May 29, 2018 for related EP Application No. EP 18 020 023.

Written Opinion of the International Searching Authority dated Mar. 28, 2018 for related PCT Application No. PCT/EP2017/025201.

Pages from European Search Report, including Annex, dated Aug. 10, 2017 for related EP Application No. EP 16 020 445.

Pages from European Search Report, including Annex, dated Jan. 17, 2017 for related EP Application No. EP 16 020 266.

* cited by examiner

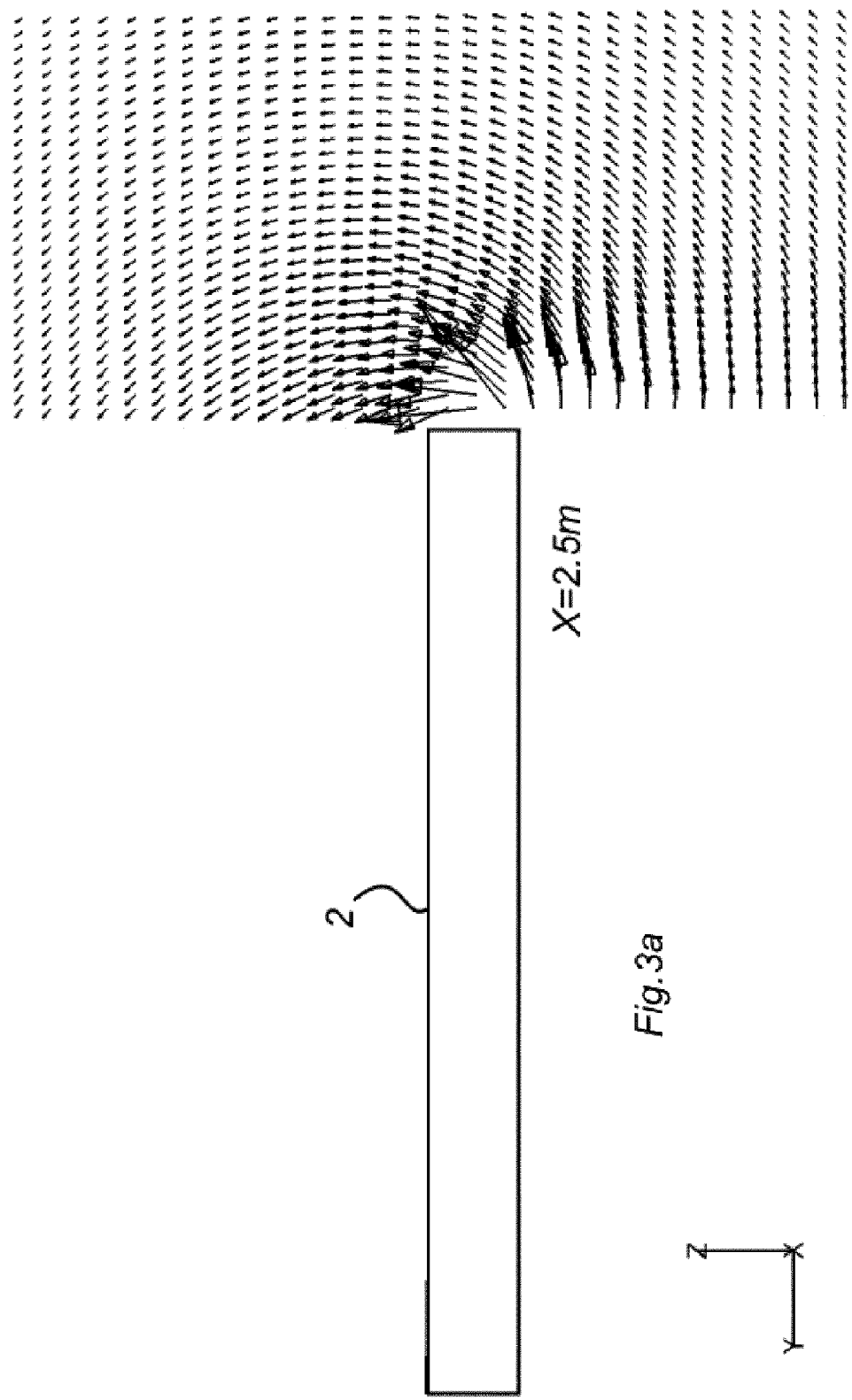

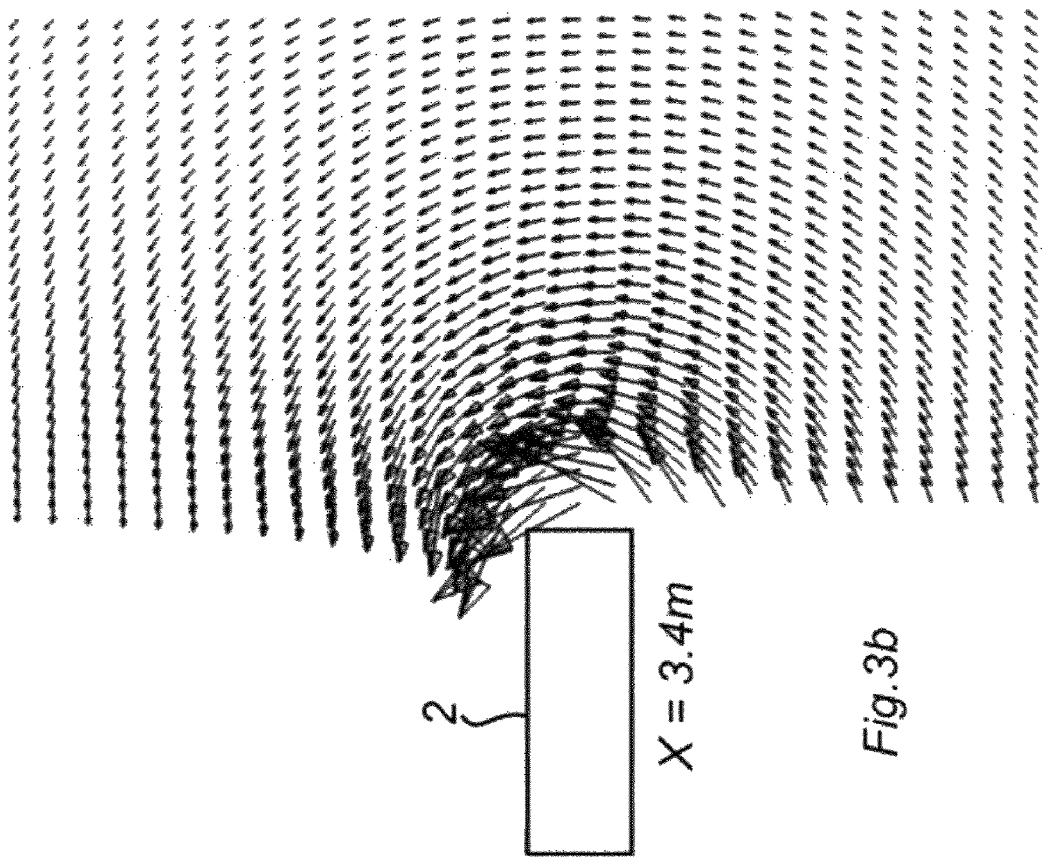

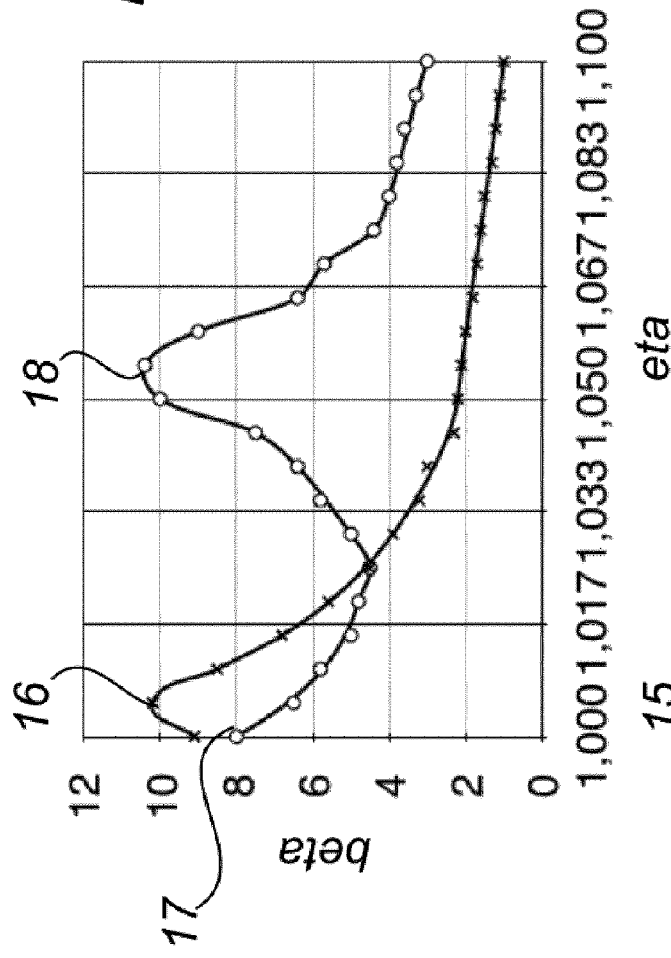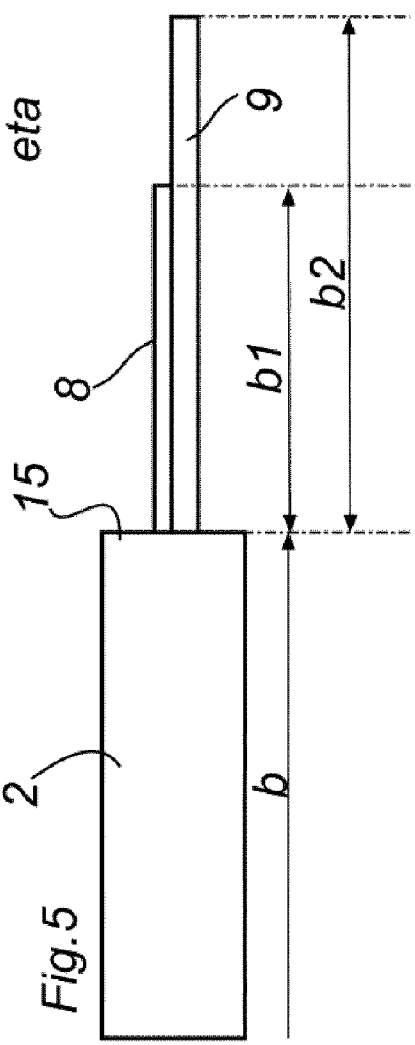

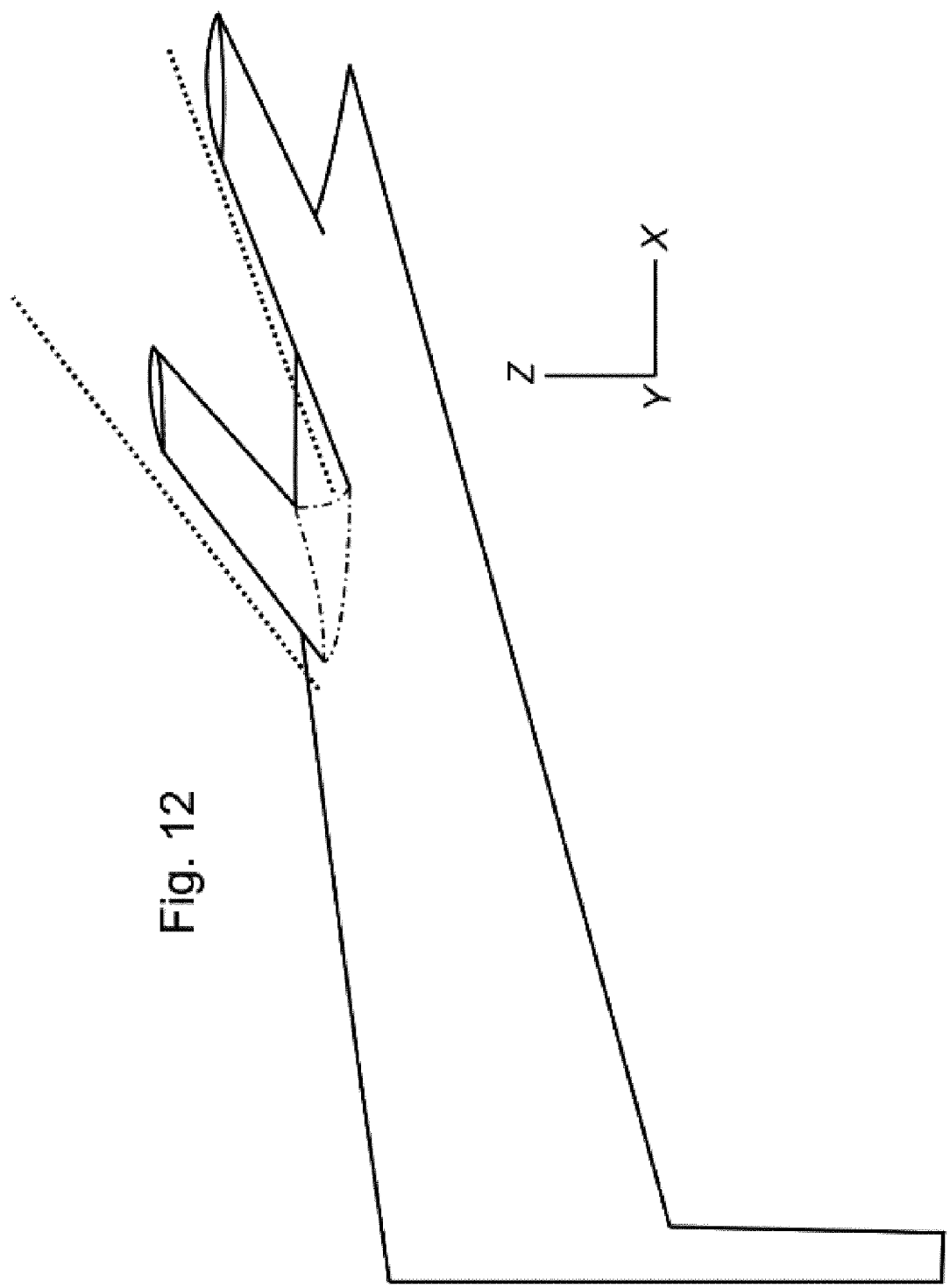

AIRPLANE WING

CROSS-REFERENCE TO RELATED APPLICATIONS

This application is the national stage application under 35 U.S.C. § 371 of International Application No. PCT/EP2017/025204 filed on 12 Jul. 2017, and claims the benefit of EP16020266.9 filed on 12 Jul. 2016, and EP16020445.9 filed on 11 Nov. 2016, the entire disclosures of which are incorporated herein by reference in their entireties.

The present invention relates to an airplane and a wing for an airplane.

Airplanes are one of the most important transportation apparatus both for persons and for goods as well as for military applications, and they are almost without alternative for most long-distance travels. The present invention is related to airplanes in a sense that does not include helicopters, and it relates to a wing for an airplane in a sense that does not include rotor blades for helicopters. In particular, the invention relates to airplanes having fixed wings and to such fixed wings themselves.

The basic function of a motorized airplane and its wings is to produce a certain velocity by means of a propulsion engine and to produce a required lift by means of wings of the airplane in the airflow resulting from the velocity. This function is the subject of the aerodynamic design of the wings of the airplane, for example with regard to their size, profile etc.

It is generally known to use so-called wing tip devices or winglets at the outer ends of the main wings of airplanes, i.e. of those wings mainly or exclusively responsible for the lift. These winglets are meant to reduce so-called wing tip vortices which result from a pressure difference between a region above and a region below the wing, said pressure difference being the cause of the intended lift. Since there is some end of the wing, the airflow tends to compensate the pressure difference which results in a vortex. This wing tip vortex reduces the lifting effect of the wing, increases the noise produced, increases energy loss due to dissipation in the airflow, and can be detrimental for other aircrafts closely following the airplane. The winglets mentioned are so to speak a baffle against the wing tip vortex.

The problem of the present invention is to provide an improved wing having a winglet and an improved respective airplane.

In order to solve this problem, the invention is directed to a wing for an airplane having a wing length from a base body of said airplane towards an outer wing end and at least two winglets on said outer wing end connected to said wing, an upstream one of said winglets preceding a downstream one of said winglets in a flight direction of said airplane, said upstream winglet producing a winglet tip vortex additionally to a wing tip vortex produced by said wing, said winglet tip vortex and said wing tip vortex being superposed in a plane between said upstream and downstream winglets and perpendicular to said flight direction, wherein an airflow in said plane is inclined relative to said flight direction wherein said downstream winglet is adapted to produce a lift having a positive thrust component, in said airflow, and to an airplane having two such wings mutually opposed as well as to a use of an upgrade part comprising respective winglets for mounting to an airplane in order to produce such a wing or airplane.

The invention relates to a wing having at least two winglets wherein these winglets are fixed to an outer wing end of the wing. To avoid misunderstandings, the "wing" can be the main wing of the airplane which is (mainly) responsible for the required lift; it can, however, also be the horizontal stabilizer wing which is normally approximately horizontal as well. Further, the term "wing" shall relate to the wing as such as originating at the airplane's base body and extending therefrom outwardly. At an outer wing end of this wing, the at least two winglets are fixed and extend further, but not necessarily in the same direction. As principally already known in the prior art, a winglet can be inclined relative to the wing and/or bent. Preferably, the winglets do not extend inwardly from the outer wing end, however.

A first thought of the inventors is to use the inclined airflow in the region of the tip vortex of the wing in a positive sense. A further thought is to produce an aerodynamic "lift" in this inclined airflow having a positive thrust component, i.e. a forwardly directed component parallel to the flight direction of the airplane. Herein, it should be clear that the "lift" relates to the aerodynamic wing function of the winglet. It is, however, not necessarily important to maximize or even create a lifting force in an upwardly directed sense, here, but the forward thrust component is in the centre of interest.

A third thought of the inventors is so to speak to condition the airflow for this intended function of a winglet. In this respect, they found it advantageous to "broaden" the inclined airflow in order to make an improved use thereof. This makes sense because a wingtip vortex is quite concentrated so that substantial angles of inclination of the airflow direction (relative to the flight direction) can be found only quite near to the wingtip. The inventors found it effective to use a comparatively long winglet in relation to this situation, then, because a longer winglet can better be optimized in an aerodynamic sense. Therefore, the invention provides for at least two winglets, one upstream winglet being intended for "broadening" the region of inclined airflow and a downstream winglet being intended for producing a thrust component therefrom.

The upstream winglet is intended for "splitting" the wingtip vortex of the wing by "shifting" a part thereof to the winglet tip, i.e. outwardly. Consequently, a superposition of the winglet-induced tip vortex (winglet tip vortex) and the vortex of the "rest of" the wing (said wing being deeper in the direction of flight than the winglet) results. As the embodiments show, this superposition broadens the region of inclined airflow. Consequently, a comparatively long (long in the definition hereunder) winglet can be used as the downstream winglet and can be confronted with the inclined airflow thus produced.

In particular, the downstream winglet shall have a greater spanwise length than the upstream winglet, preferably between 105% and 180% of the upstream winglet length. Therein, lower limits of 110%, 115%, 120%, 125%, 130%, 135% and 140% are more preferred, respectively, whereas upper limits of 175%, 170%, 165%, and 160% are more preferred, respectively. Still further, the upstream winglet shall have a comparatively large aspect ratio (relation of length and "depth" or "chord") of between 3 and 7. More preferred are lower limits of 3.5, 4, 4.5, respectively, and upper limits of 6.5, 6, 5.5, respectively.

The term "length" or "spanwise length" as used here is intended to describe the length of a wing or winglet in a projection plane perpendicular to the flight direction. Since wings and, in particular, winglets need not be straight and/or horizontal in that projection, the term "length" shall be defined as the length of a centreline intermediate between an upper limitation line and a lower limitation line of the so projected wing or winglet. The origin of the length of a wing shall be the middle of the base body, and the transition between the wing and any winglets shall be where a separation between the (at least two) winglets commences. The "aspect ratio" as referred to herein shall refer to the thus defined length.

A winglet according to the invention, in particular the so-called downstream winglet produces a lift if attacked by an airflow wherein the lift is, per definition, perpendicular to the main direction of the airflow upstream of the winglet. This lift can be seen as a superposition of two components, one being parallel to the flight direction and the other perpendicular thereto. This latter component can be seen as a superposition of a positive or negative vertical component increasing or decreasing the total lifting force acting on the airplane, and a further component taken up by the airplane and usually compensated in that antisymmetric wings and winglets are used in both sides of the airplane (or compensated by a vertical tail).

The inventors have found that with an inclined airflow (relative to the flight direction) the flight direction parallel component can be increased. Since the tip vortex of a wing or winglet is basically a deviation of the airflow from a flight direction parallel flow, it can be used in the manner according to this invention.

As explained above, it is advantageous to broaden the effective region of inclined airflow for this purpose in order to enhance the thrust contribution of the downstream winglet. Nota bene, this does not exclude a thrust contribution by the upstream winglet itself whereas this is usually much smaller and not mandatory at all.

The broadening effect of the upstream winglet shall include a splitting of the tip vortex so to speak by shifting a part of the wing tip vortex outwards (by transforming it into the upstream winglet tip vortex). However, further effects can be taken advantage of herein, in particular, a so-called downwash or upwash of the upstream winglet, namely a change of the main airflow direction by the upstream winglet due to its wing action (and independent from the vortices) can enhance the desired inclination.

As regards the splitting or broadening effect, reference can be made to FIG. 6. In the case shown there, the broadened airflow has two maxima, one at the origin of the winglet (left border of the graph) and another one approximately at the position of the outer end of the upstream winglet. Independently from the precise location of these maxima, the existence of the latter "intermediate" maximum is somewhat typical for the "vortex splitting" mechanism referred to but not necessary. If for example the upstream winglet tip vortex is very small, the intermediate maximum might not be visible as such or might be less pronounced but still the broadening effect would appear. However, the existence of the intermediate maximum at some distance from the outer wing end is preferred and it is further preferred that in this case the values of the air velocity angle (as shown in the figure) do not fall under a certain limit between the two maxima, in particular not below 25% of the smaller one of the maxima and preferably even not below 25% of the larger one (and thus of both maxima). Further, the dependency of the air velocity angle shall maintain values above 25% up to at least 5% of the wing length as exemplified in the figure. The lower limits of 25% can (independently of each other for both definitions) preferably be 30%, 35%, and even 40%. Further, the lower limit of 5% of the wing length can preferably also be 5.5%, 6%, 6.5%.

As mentioned above, the downstream winglet shall be longer (in the defined sense of length) than the upstream winglet. The upstream winglet, on the other hand, can preferably have a length between 3% and 8% of the wing length. The lower limit can preferably also be 3.5% or 4% and the upper limit can preferably also be 7.5%, 7%, and 6.5%. In the embodiment, this means practically that the wing length is 20 m, the length of the upstream winglet is 1 m (5%), and the length of the downstream winglet is 1.5 m (150% of the upstream winglet length).

As already explained, the downstream winglet has an aspect ratio of between 3 and 7. The same aspect ratio is preferred for the upstream winglet. In both cases, but independently of each other, a lower limit of 3.5 or 4 and an upper limit of 6.5 or 6 is more preferred. The aspect ratios mentioned have proven to be an advantageous compromise between aerodynamic efficiency (leading to slim shapes with big length and low depth or chord) and projection area (determining the quantity of the aerodynamic effects as well but also increasing drag).

Further, since the thrust contribution of the downstream winglet is focussed on, an asymmetric wing profile can be preferable here to enhance the aerodynamic efficiency. An asymmetric wing profile of the upstream winglet is possible, but not that important.

Since the winglets increase the overall span of the airplane at least in most cases and since the generation of a thrust contribution has not proven to imply an important horizontal component of the winglet orientation, the upstream and the downstream winglets are preferably inclined relative to the wing. The inventors have found that an upward inclination is preferred compared to a downward inclination in particular because a substantial ground clearance can be important for airplanes (for starting and landing). The degree of inclination can i.a. determine the contribution of the winglets to the overall lifting force of the airplane.

Generally, an upward inclination of the first winglet relative to the second winglet is preferred.

The upstream and downstream winglets need not necessarily be the most upstream and the most downstream winglet, respectively (but they should be neighboured and not be separated by a further winglet). There could for example be a third winglet downstream of the "downstream winglet". This third winglet could further contribute to the thrust component by a similar mechanism as described with regard to the "downstream winglet". However, it will often not be preferred that this third winglet is much longer than the preceding one or longer at all. A first reason is that with increasing length problems with mechanical stability, weight and the overall span of the airplane increase. A second reason is that with a proper design of the preceding winglets, the degree of inclination in the airflow "seen" by this third winglet is less pronounced so that the thrust contribution produced thereby will not be dominant, anyway.

Thus, a length of the third winglet between 60% and 120% of the length of the preceding "downstream winglet" is preferred. The lower limit can preferably also be 65%, 70% and the upper limit can preferably also be 110%, 100%, 90%.

Still further, it is also contemplated to use four winglets wherein basically two pairs with each implementing a similar aerodynamic mechanism as described so far are used. Here, it could be preferred to use one of these pairs in an upwardly inclined manner and the other pair in a downwardly inclined manner. However, two or three winglets are preferred, respectively.

Again, a more upward inclination of the second winglet relative to the third winglet is preferred.

Finally, even winglets upstream of "the upstream winglet" are not excluded.

As already mentioned, the invention is preferably used for two wings of the same airplane mutually opposed. In particular, the respective two wings and the winglets according to the invention on both sides can be antisymmetrical with regard to a vertical centre plane in the base body of the airplane. In this sense, the invention also relates to the complete airplane.

Further, the invention is also contemplated in view of upgrade parts for upgrading existing airplanes. For economic reasons, it can be preferred to add such an upgrade part including at least two winglets at a conventional wing (or two opposed wings) rather than to change complete wings or wingsets. This is particularly reasonable because the main advantage of the invention cannot be to increase the lift force of the wings which could exceed limitations of the existing mechanical structure. Rather, the invention preferably aims at a substantial thrust contribution to improve efficiency and/or speed. Consequently, the invention also relates to such an upgrade part and its use for upgrading an airplane or a wing in terms of the invention.

The invention will hereunder be explained in further details referring to exemplary embodiments below which are not intended to limit the scope of the claims but meant for illustrative purposes only.

Figure 4:
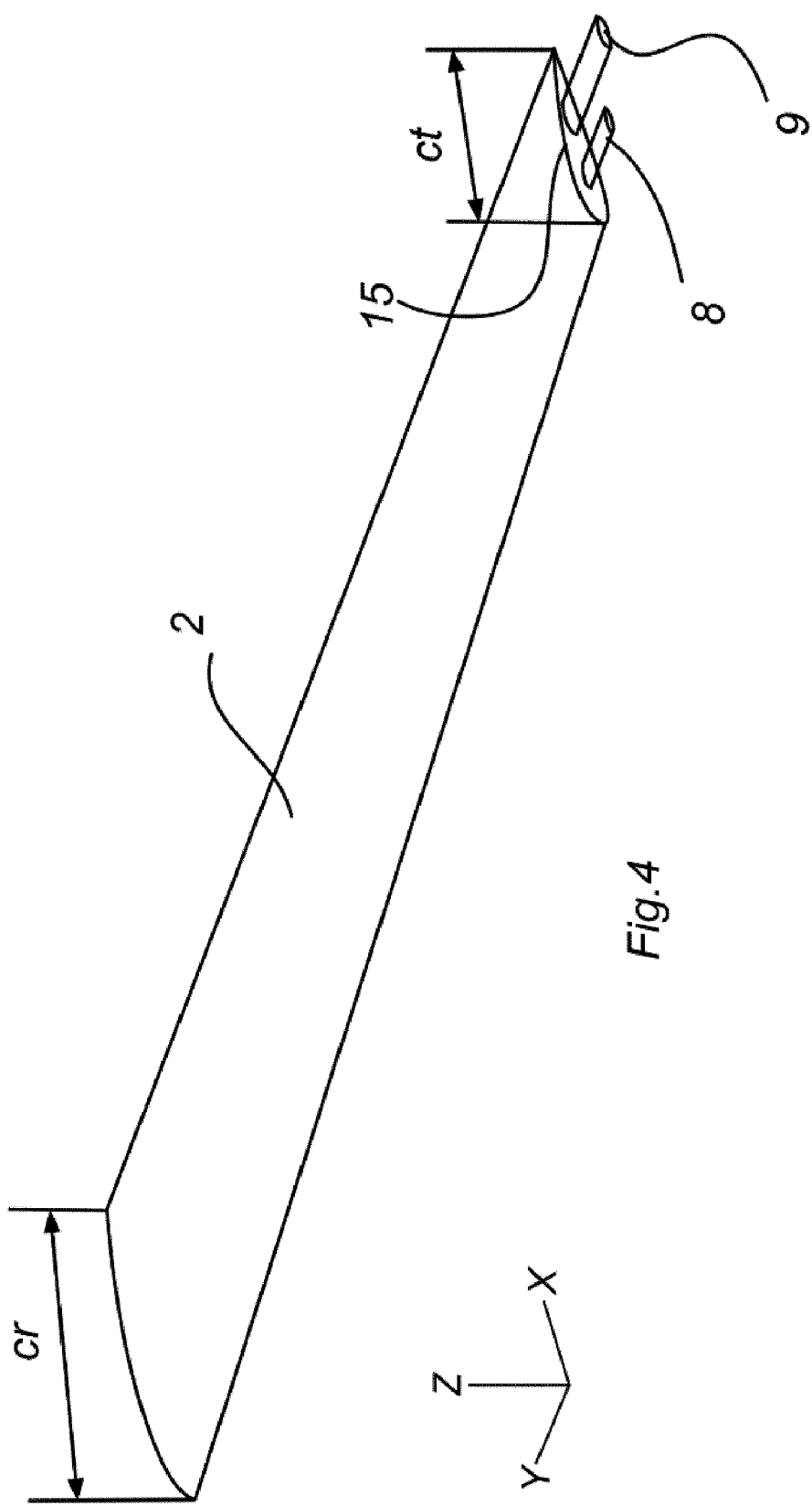
Figure 7:
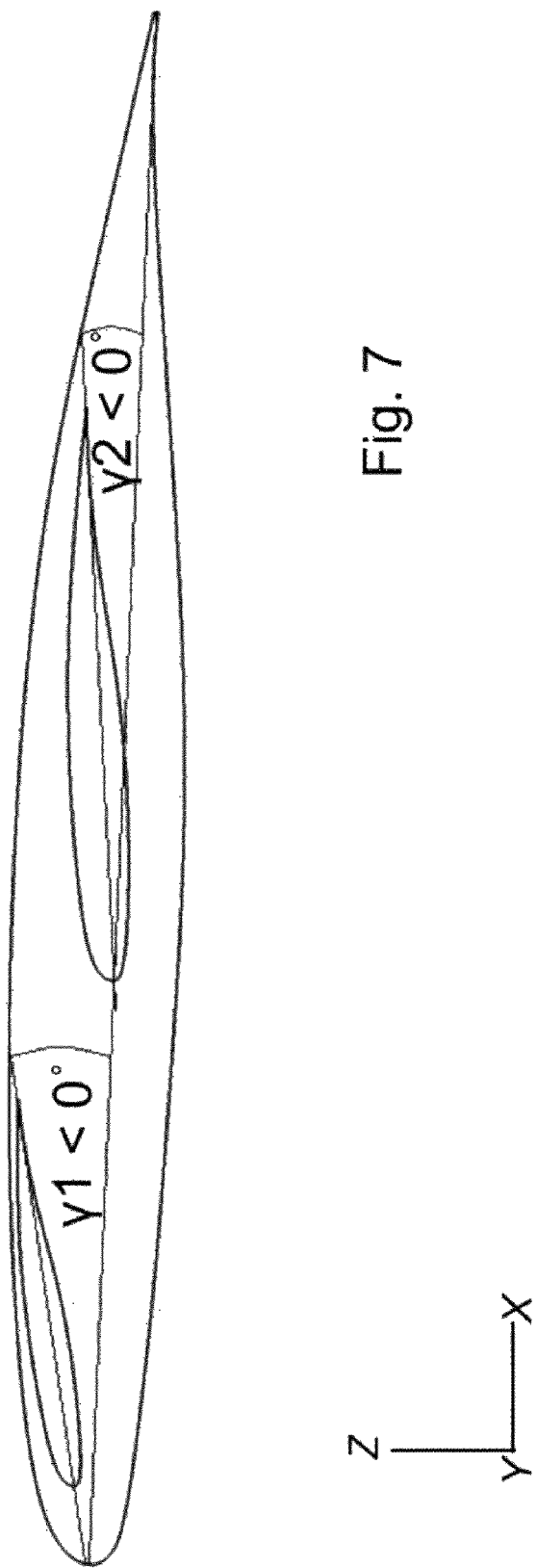
Figure 8:
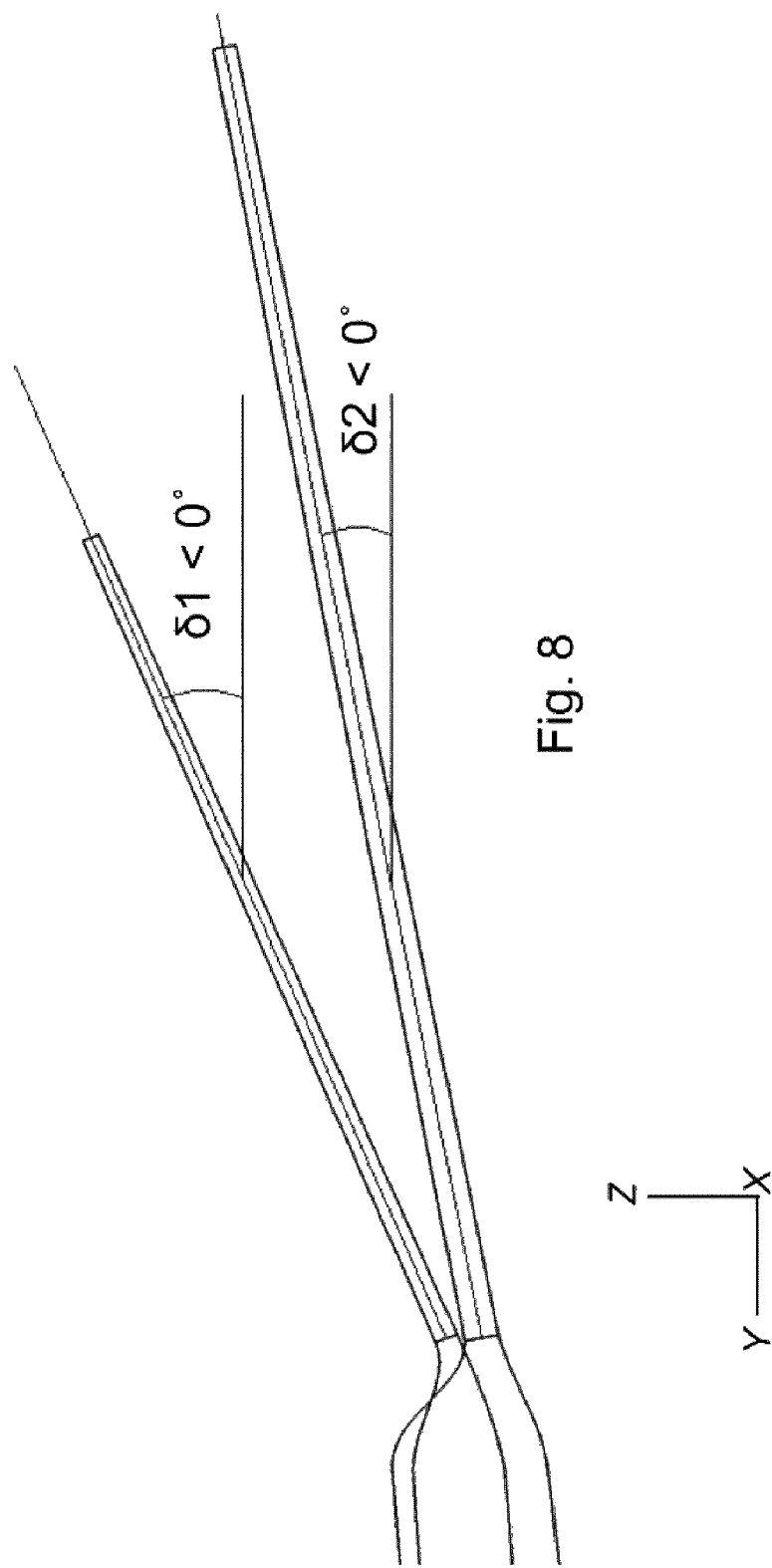
Figure 10:
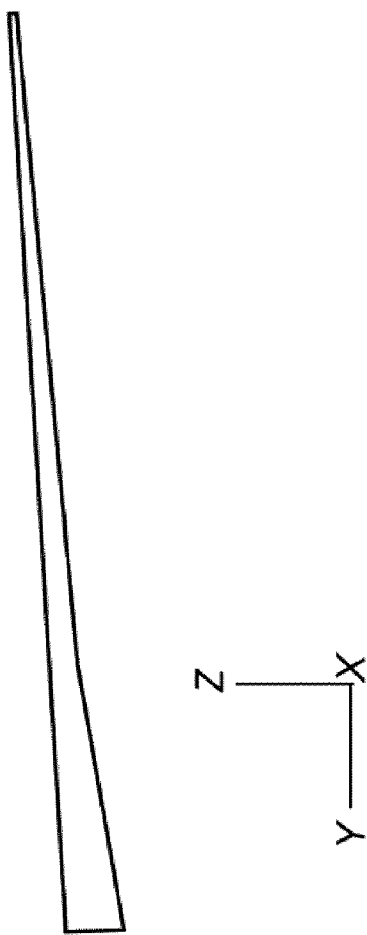
Figure 11:
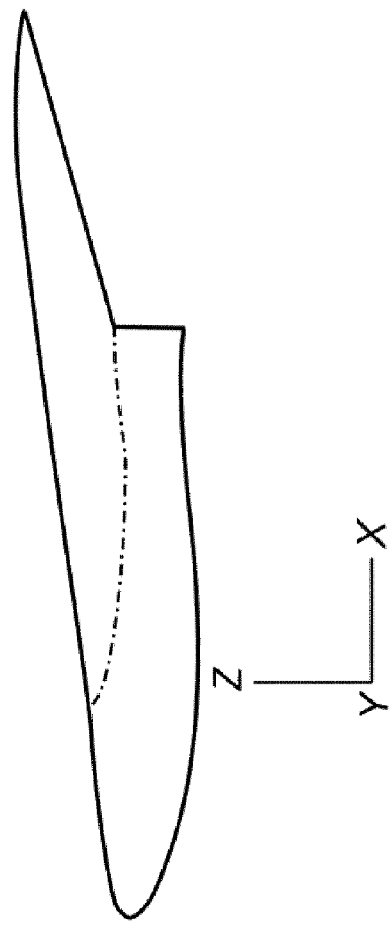
Figure 9:
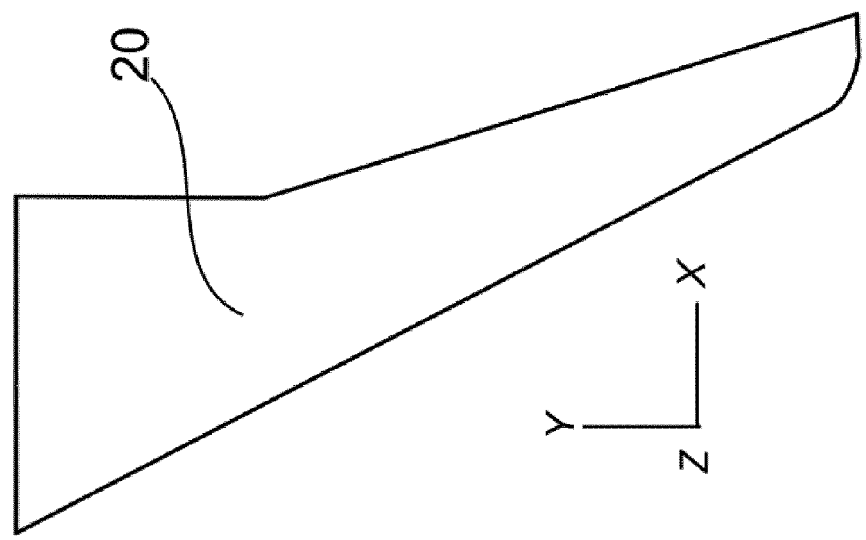
Figure 13:
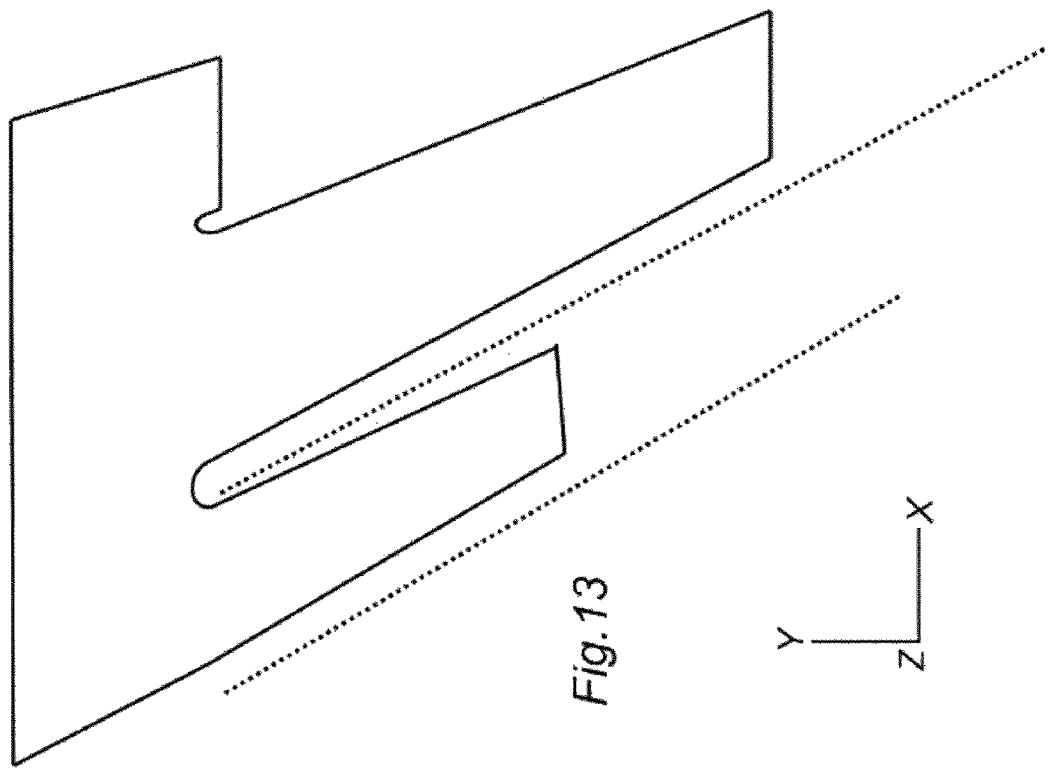
Figure 18:
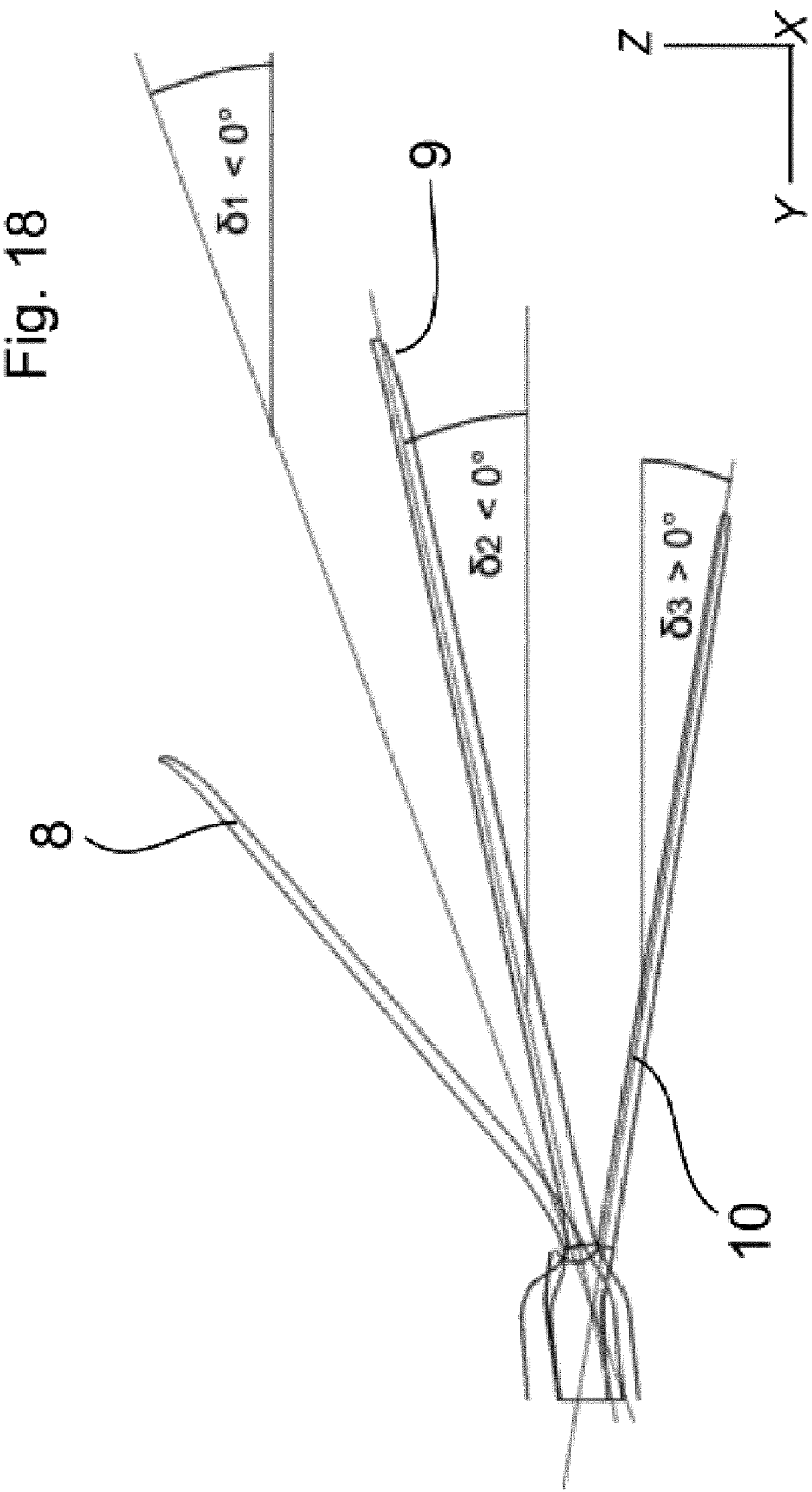
Figure 19:
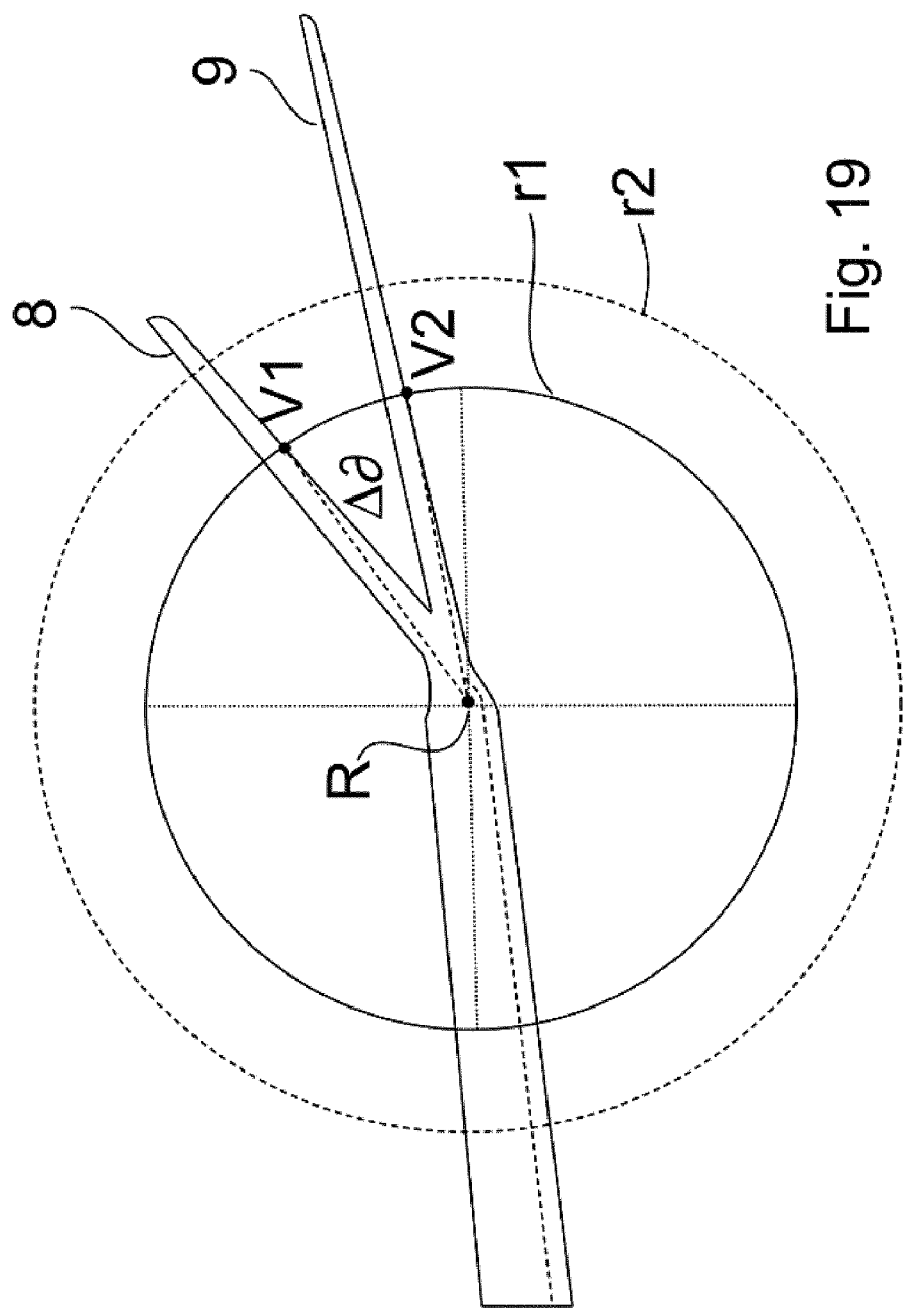
Figure 20:
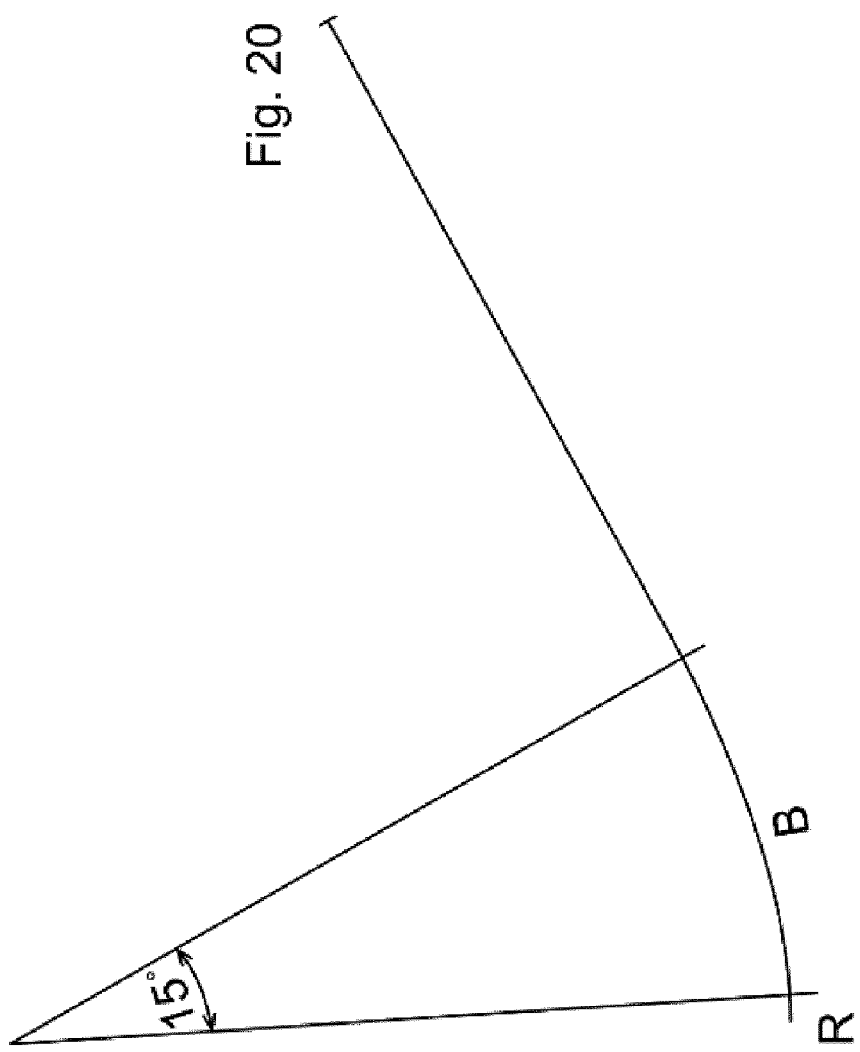
Figure 21:
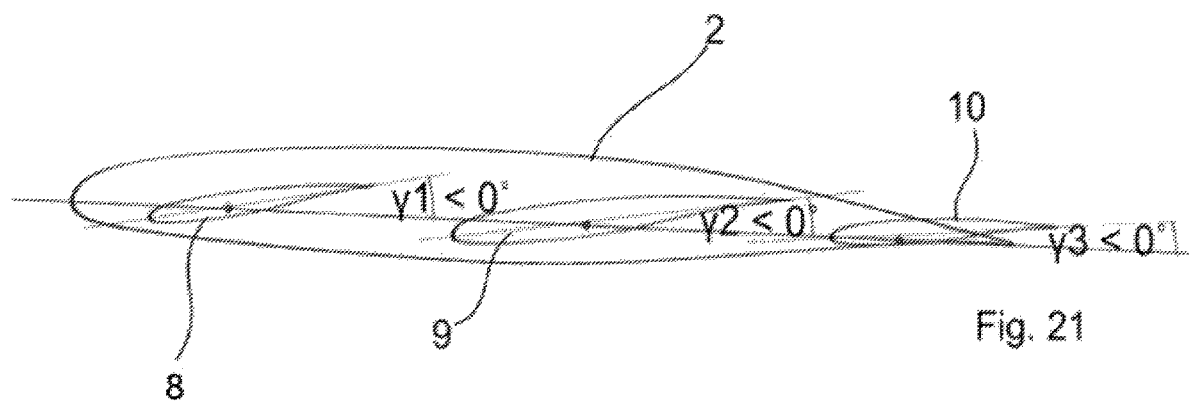
Figure 22:
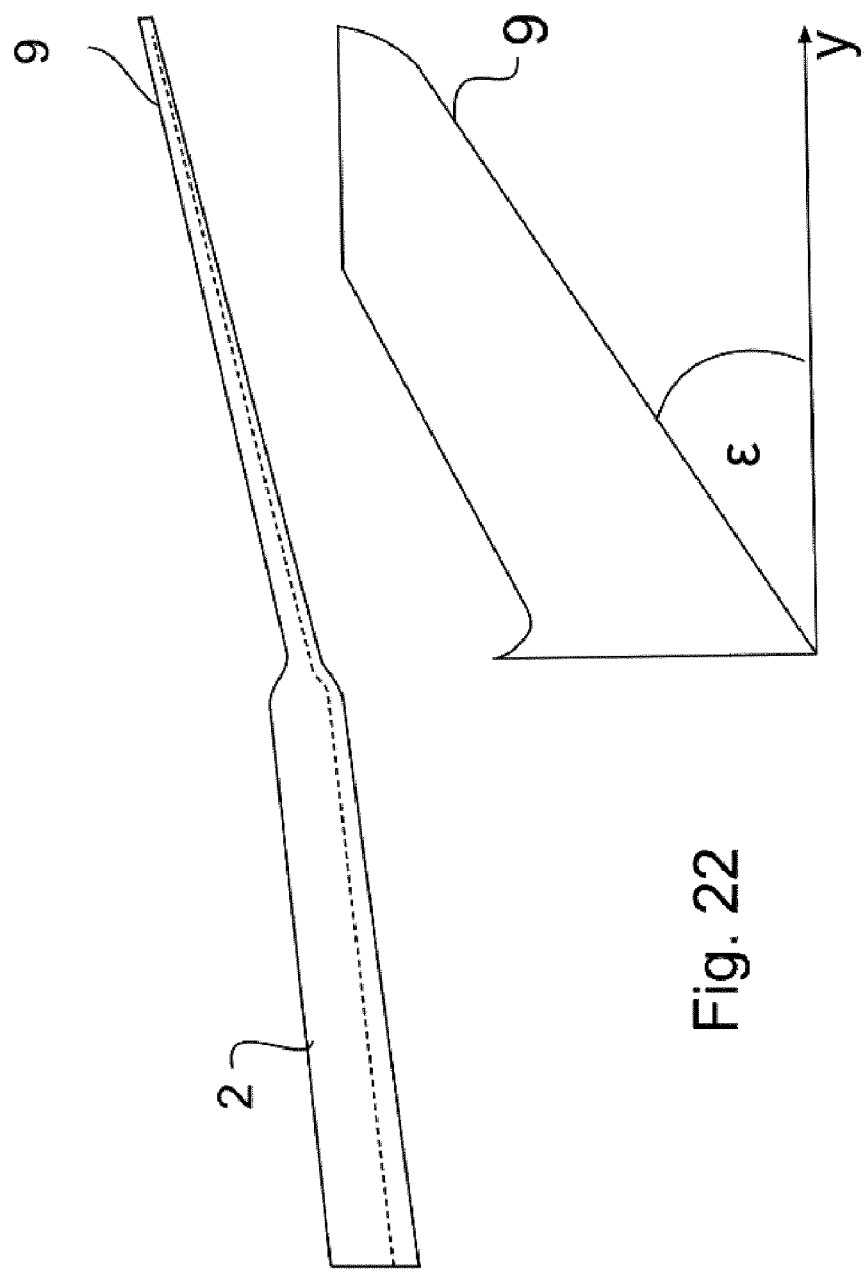
Figure 23:
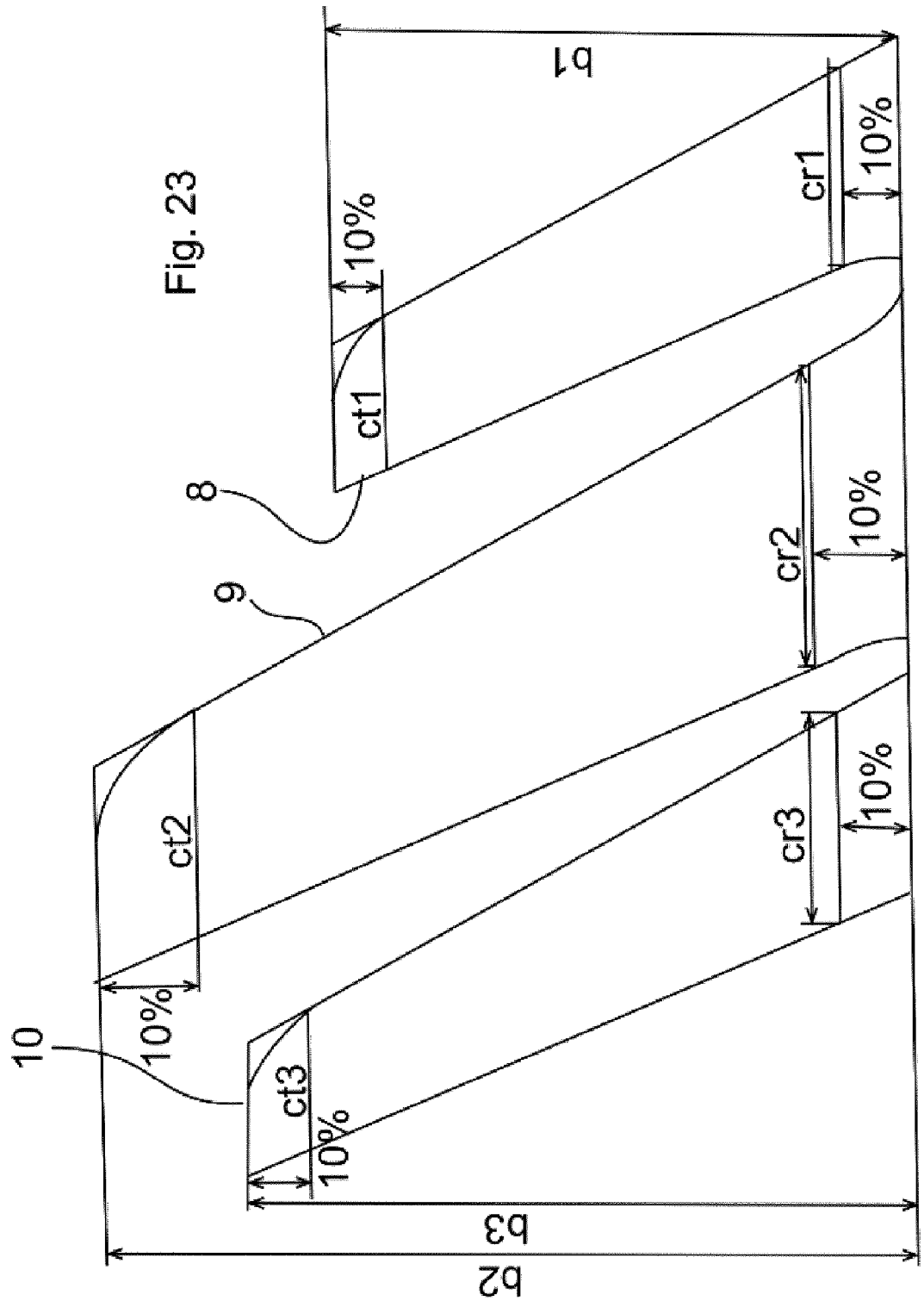
Figure 24:
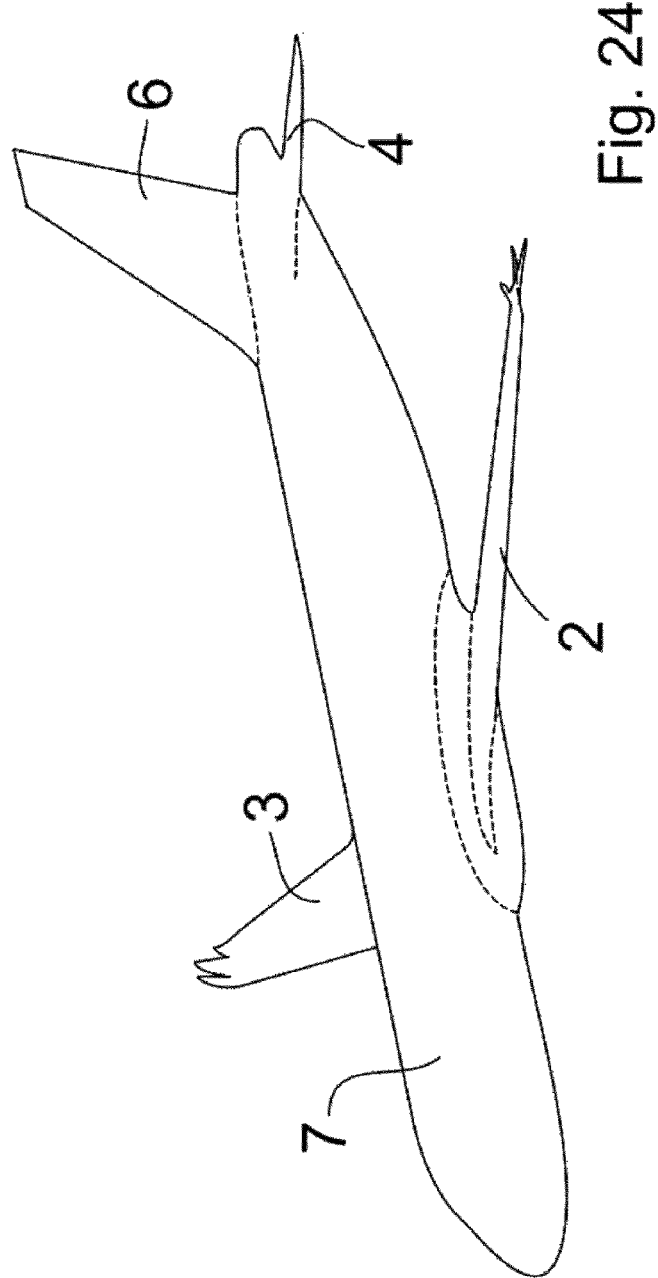
Figure 25:
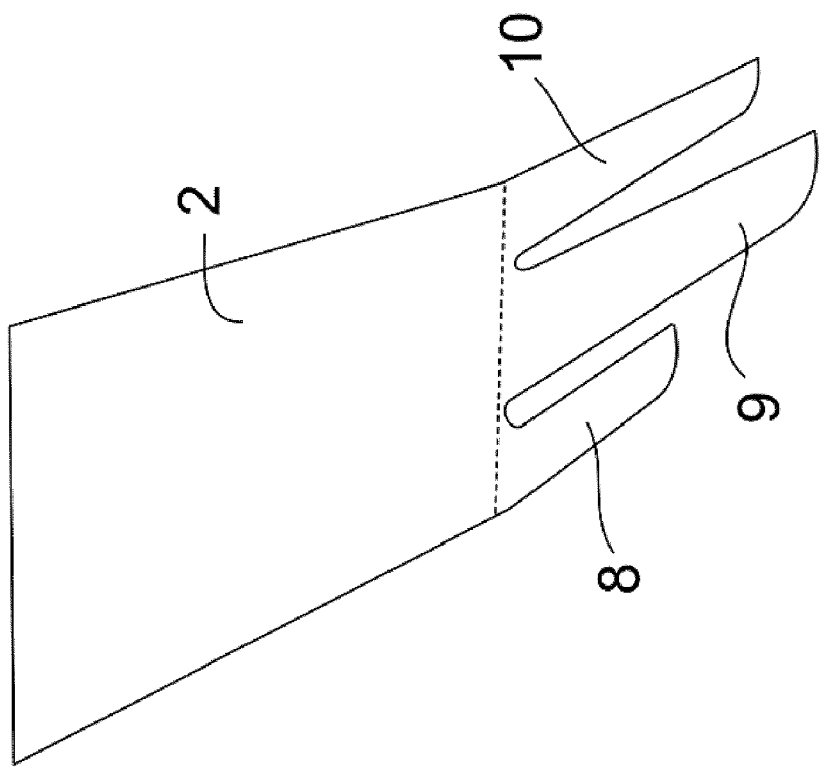
Figure 26:
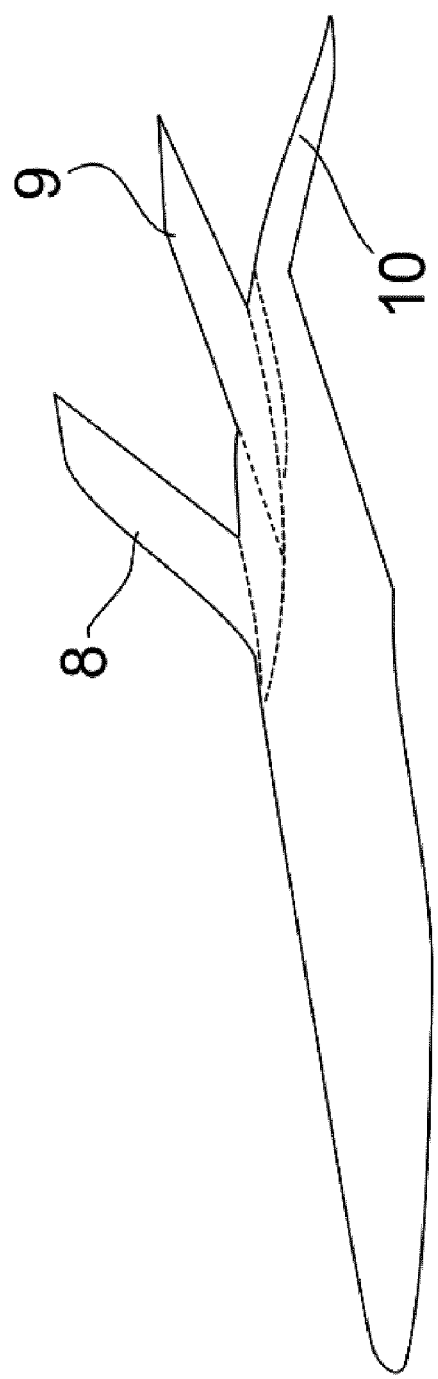

FIG. 3a, b are schematic illustrations of the air velocity distribution in a tip vortex;

FIG. 4 is a schematic perspective view of a wing according to the invention;

FIG. 5 is a schematic front view of a wing tip according to the invention including two winglets;

FIG. 6 is a diagram showing two graphs of an inclination angle dependency on distance relating to FIG. 5;

FIG. 7 is a schematic side view to explain the gamma angles of two winglets of an embodiment;

FIG. 8 is a front view of the same winglets to explain the delta angles;

FIG. 9 is a plan view of an Airbus A320 main wing;

FIG. 10 is a front view of said wing;

FIG. 11 is a side view of said wing;

FIG. 12 is a side view to explain reference lines used for simulations in the embodiment;

FIG. 13 is a top view to illustrate the same reference lines;

FIGS. 14 to 17 are diagrams illustrating beta angles at varying distances from the main wing tip for various simulations in the embodiment;

FIG. 18 is a front view of three winglets according to an embodiment of the invention showing their dihedral angles;

FIG. 19 is another front view of two winglets for explaining a relative dihedral angle;

FIG. 20 is a schematic drawing for explaining a bending of a first winglet;

FIG. 21 is a side view of sections of a main wing and three winglets for explaining angles of inclination;

FIG. 22 combines a front view and a top view for explaining a sweepback angle of a winglet;

FIG. 23 is a top view onto three winglets in a plane for explaining the shape;

FIG. 24 is a perspective drawing of a complete airplane according to the invention;

FIG. 25 is a top view onto three winglets at a main wing tip of said airplane;

FIG. 26 is a side view of the three winglets of FIG. 25; and

Figure 27:
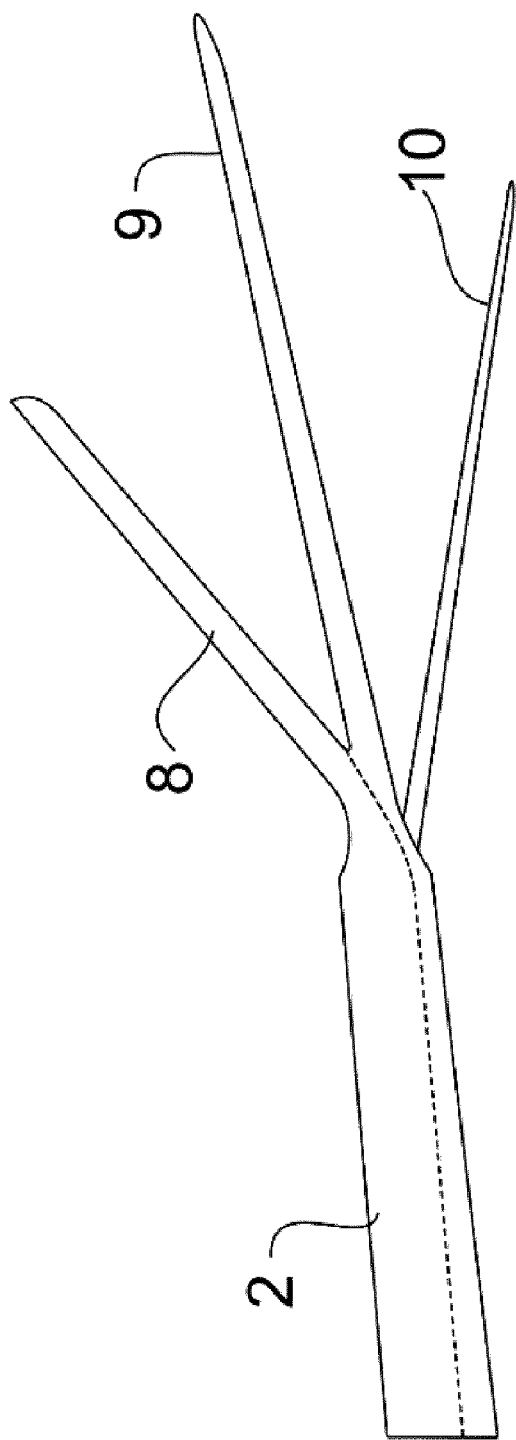

FIG. 27 is a front view thereof.

Figure 1:
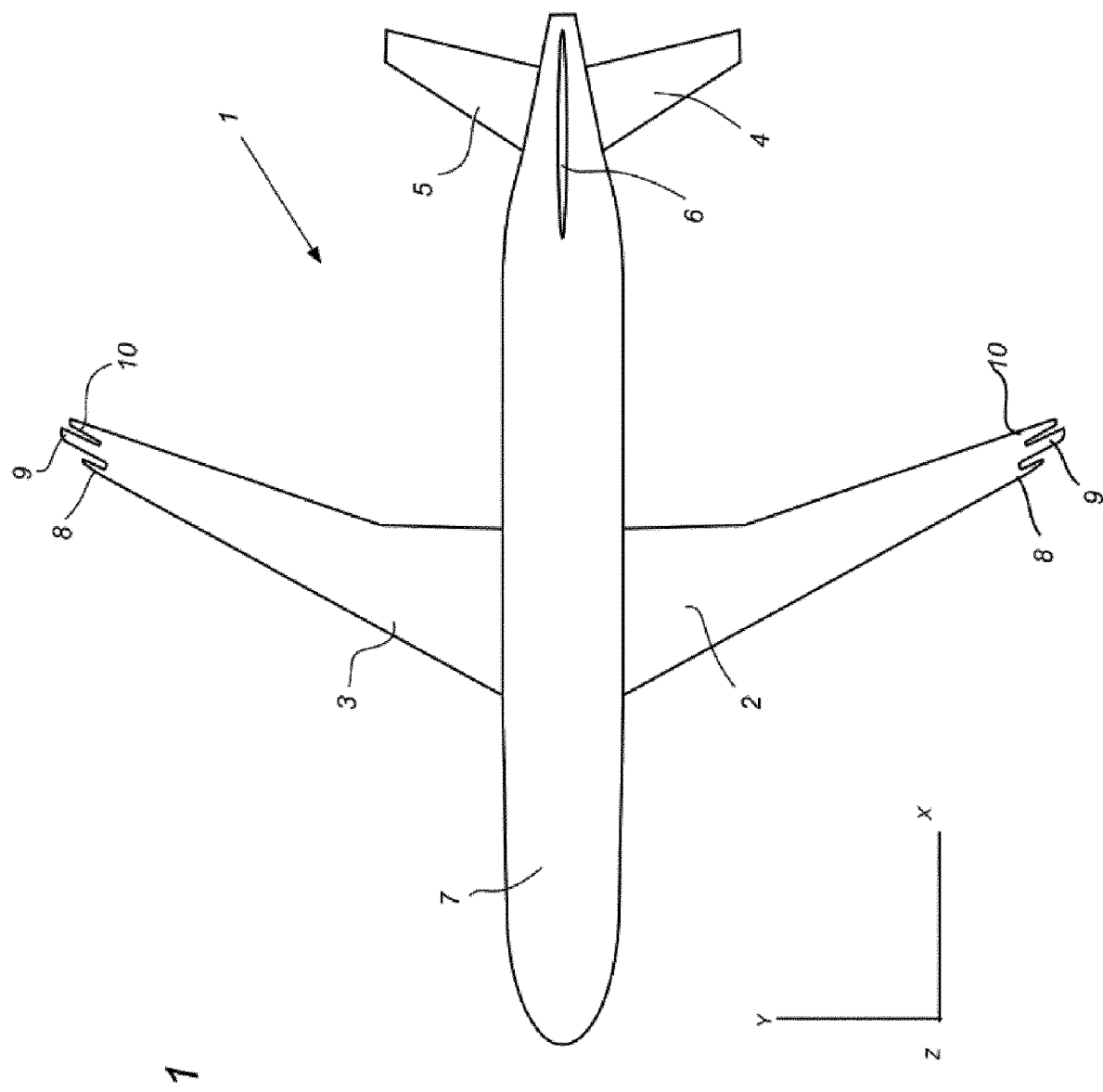
FIG. 1 shows a plan view of an airplane according to the invention including six winglets schematically drawn.

FIG. 1 is a plan view of an airplane 1 having two main wings 2 and 3 and two horizontal stabilizers 4 and 5 as well as a vertical tail 6 and a fuselage or base body 7. FIG. 1 shall represent an Airbus model A 320 having four propulsion engines, not shown here. However, in FIG. 1, the main wings 2 and 3 each have three winglets 8, 9, 10, respectively. Two respective winglets sharing a reference numeral are mirror symmetrical to each other in an analogous manner as both main wings 2 and 3 and the base body 7 are mirror symmetric with regard to a vertical plane (perpendicular to the plane of drawing) through the longitudinal axis of the base body.

Further, an x-axis opposite to the flight direction and thus identical with the main airflow direction and a horizontal y-axis perpendicular thereto are shown. The z-axis is perpendicular and directed upwardly.

Figure 2:
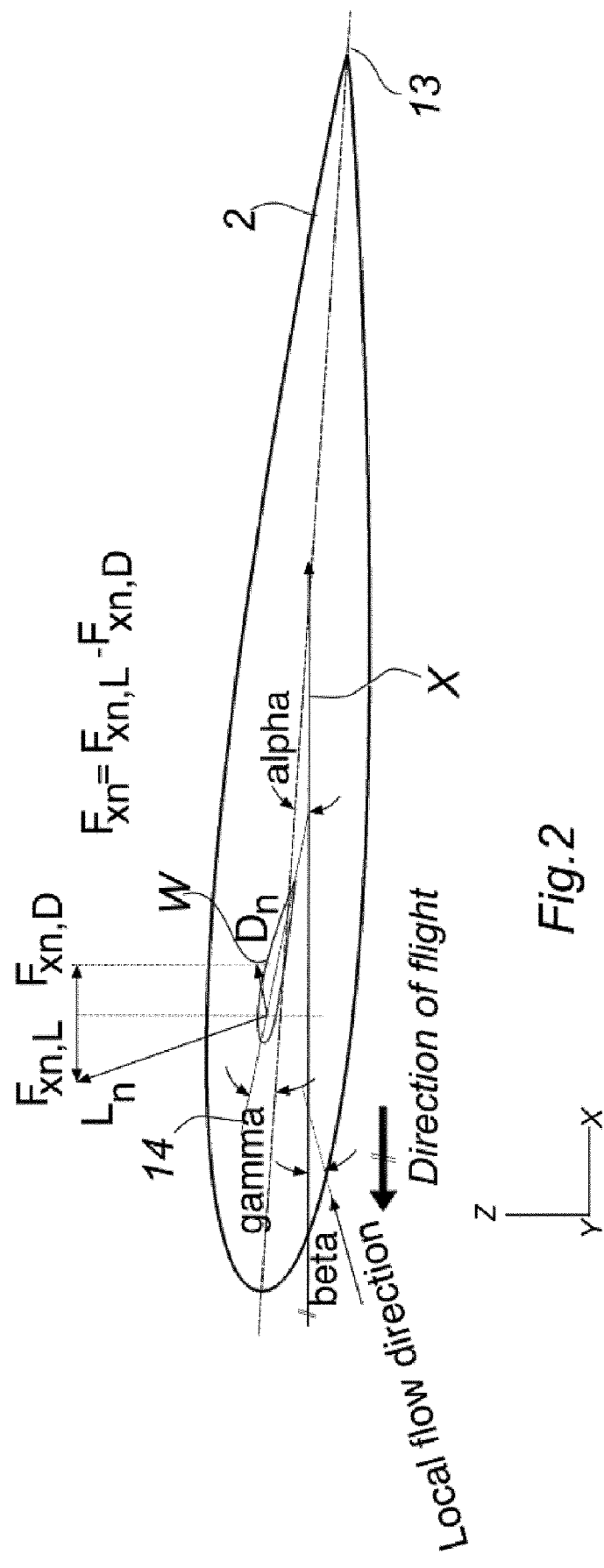
FIG. 2 is a schematic diagram for explaining the creation of a thrust by a winglet.

FIG. 2 is a schematic side view of an airfoil or profile (in FIG. 2 a symmetric standard wing airfoil, in case of the A 320 an asymmetric airfoil) of a main wing 2 and an airfoil (for example NACA 2412, a standard asymmetric wing airfoil or RAE 5214, an asymmetric wing airfoil for transonic flight conditions) of an exemplary winglet W which is just for explanation purposes.

A solid horizontal line is the x-axis already mentioned. A chain-dotted line 13 corresponds to the chord line of the main wing 2 (connecting the front-most point and the end point of the profile), the angle alpha there between being the angle of attack of the main wing.

Further, a bottom line 14 of the profile of winglet W (which represents schematically one of winglets 8, 9, 10) is shown and the angle between this bottom line 14 and the bottom line of the main wing profile is gamma, the so-called angle of incidence. As regards the location of the definition of the chord lines along the respective span of the wing and the winglets reference is made to what has been explained before.

FIGS. 3a and b illustrate a tip vortex as present at any wing tip during flight. The fields of arrows at the right sides symbolize the component of the airflow velocity in the plane of drawing as regards direction and magnitude (arrow length). FIG. 3a shows a point of x=2.5 m (x=0 corresponding to the front end of the wing tip) and FIG. 3b relating to a downstream location of x=3.4 m. It can be seen that the tip vortex "develops with increasing x" and that the vortex is quite concentrated around the wing tip and quickly vanishes with increasing distance therefrom. This statement relates to almost any direction when starting from the wing tip with no qualitative but also small quantitative differences.

Further, FIGS. 3a and b illustrate that the wing tip vortex principally adds some upward component to the airflow velocity together with some outward component in the lower region and some inward component in the upper region. With this in mind, it can be understood that FIG. 2 shows a local flow direction having an angle beta to the flight direction x. This local flow direction (components perpendicular to the plane of drawing of FIG. 2 being ignored) attacks the symbolic winglet W and causes a lift $L_n$ thereof as shown by an arrow. This lift is perpendicular to the flow direction by definition. It can be seen as a superposition of a vertically upward component and a positive thrust component $F_{xn,L}$.

Principally the same applies for the drag $D_n$ of the winglet W. There is a negative thrust component of the drag, namely $F_{xn,D}$. The thrust contribution of the winglet W as referred to earlier in this description is thus the difference thereof, namely $F_{xn}=F_{xn,L}-F_{xn,D}$ and is positive here. This is intended by the invention, namely a positive effective thrust contribution of a winglet.

FIG. 4 shows the main wing 2 and exemplary two winglets of FIG. 2, namely 8 and 9. Wing 2 is somewhat inclined relative to the y-axis by a so called sweepback angle and has a chord line length decreasing with the distance from the base body 7 from a root chord line length cr to a tip chord line length ct. At a wing outer end 15, winglets 8 and 9 are mounted, compare also FIG. 5.

FIG. 5 shows the wing 2 and the winglets 8 and 9 in a projection on a y-z-plane and the length b of main wing 2 (b being measured from the centre of base body 7 at y=0 along the span of main wing 2 as explained before) and respective lengths b1 and b2 of winglets 8 and 9, respectively. For simplicity, wing 2 and winglets 8 and 9 are shown straight and horizontal, only. However, an inclination relative to wing 2 around an axis parallel to the x-axis would not lead to qualitative changes.

FIG. 6 shows a diagram including two graphs. The vertical axis relates to beta (compare FIG. 2), namely the angle of inclination of the local airflow direction in a projection on a x-z-plane.

The horizontal line shows "eta", namely the distance from outer wing end 15 divided by b, the length of main wing 2.

A first graph with crosses relates to the condition without winglets 8 and 9 and thus corresponds to FIGS. 3a and b, qualitatively. The second graph showing circles relates to an airflow distribution downstream of first winglet 8 and thus upstream of second winglet 9 (the first graph relating to the same x-position). The graphs result from a computer simulation of the airflow distribution (such as FIGS. 3a and b).

It can easily be seen that the first graph shows a maximum 16 closely to outer wing end 15 whereas the second graph has a maximum 17 there, an intermediate minimum at around eta=1.025 and a further maximum 18 at around eta=1.055, and decreases outwardly therefrom. Further, the second graph drops to a value of more than 50% of its smaller (left) maximum and more than 40% of its larger (right) maximum whereas it drops to a value of still more than 25% of its larger maximum at about eta=1.1, e.g. at a distance of about 10% of b from outer wing end 15. This angle distribution is a good basis for the already described function of winglet 9, compare FIG. 2.

Simulations on the basis of the airplane type Airbus A320 have been made. They will be explained hereunder. So far, the inventors achieve around 3% reduction of the overall drag of the airplane with three winglets as shown in FIG. 1 by means of the thrust contribution of the winglets and a small increase of the overall lifting force (in the region of maybe 1% lift increase). The lift increase enables the airplane to fly with a somewhat lower inclination (compare alpha in FIG. 2) which leads to a further reduction of the overall drag. These simulations have been made by the computer programme CFD (computational fluid dynamics) of ANSYS.

As a general basic study, computer simulations for optimization of the thrust contribution of a two winglet set (first and second winglet) with a standard NACA 0012 main wing airfoil and a NACA 2412 winglet airfoil and without any inclination of the winglet relative to the main wing (thus with a setup along FIGS. 4 and 5) have shown that an aspect ratio 5 is a good choice. Although higher aspect ratios are more efficient in an aerodynamic sense, they have a smaller area and thus, produce smaller forces (and thus a small thrust). In other words, within the limitation of a length b2 (span) of 1.5 m (for the A320), a substantial winglet area is preferred. On the other hand, a too low aspect ratio increases the drag and decreases the efficiency in an amount that finally reduces the effective thrust by means of an increased drag. All in all, the CFD simulations repeatedly showed optimum values around 5.

On this basis, the length b1 of the upstream first winglet 8 for the A320 has been chosen to be ⅔, namely 1 m in order to enable the downstream second winglet 9 to take advantage of the main part of the broadened vortex region, compare again the setup of FIGS. 4 and 5 and the results in FIG. 6.

The mean chord length results from the length of the fingers and from the fixed aspect ratio. As usual for airplane wings, there is a diminution of the chord line length in an outward direction. For the first upstream winglet 8, the chord line length at the root is 400 mm and at the top is 300 mm, whereas for the downstream second winglet 9 the root chord length is 600 mm and the tip chord length 400 mm. These values have been chosen intuitively and arbitrarily.

For the winglets, instead of the above mentioned (readily available) NACA 2412 of the preliminary simulations, a transonic airfoil RAE 5214 has been chosen which is a standard transonic airfoil and is well adapted to the aerodynamic conditions of the A320 at its typical travel velocity and altitude, compare below. The Airbus A320 is a well-documented and economically important model airplane for the present invention.

The most influential parameters are the angles of incidence gamma and the dihedral angle delta (namely the inclination with respect to a rotation around an axis parallel to the travel direction). In a first coarse mapping study, the mapping steps were 3° to 5° for gamma and 10° for delta. In this coarse mapping, a first and a second but no third have been included in the simulations in order to have a basis for a study of the third winglet.

FIG. 7 illustrates the angle gamma, namely gamma 1 of winglet 8, the first winglet, and gamma 2 of winglet 9, the second winglet, both shown as airfoils (compare FIG. 2) and with their chord lines in relation to the main wing airfoil and its chord line. FIG. 8 illustrates the angle delta in a perspective as in FIG. 5, but less schematic. Again, delta 1 is related to the first winglet 8 and delta 2 to the second winglet 9. The structures in the left part of FIG. 8 are transient structures as used for the CFD simulations. These structures do not correspond to the actual A320 main wing to which the winglets, the slim structures in the middle and the right, have to be mounted but they define a pragmatic model to enable the simulation.

FIG. 9 shows a plan view onto a main wing of the A320, the wing tip is oriented downward and the base body is not shown but would be on top. FIG. 9 shows a main wing 20 of the A320 which actually has a so called fence structure, namely a vertical plate, at the end of the wing which has been omitted here, because it is to be substituted by the winglets according to the invention.

FIG. 10 shows the main wing 20 of FIG. 9 in a front view, in FIG. 11 shows the main wing 20 in a side view (perspective perpendicular to the travel direction—X). The somewhat inclined V geometry of the main wings of the A320 can be seen in FIGS. 10 and 11.

A typical travel velocity of 0.78 mach and a typical travel altitude of 35,000 feet has been chosen which means an air density of 0.380 kg/m$^3$ (comparison: 1.125 kg/m$^3$ on ground), a static pressure of 23.842 Pa, a static temperature of 218.8 K and a true air speed (TAS) of 450 kts which is 231.5 m/s. The velocity chosen here is reason to a compressible simulation model in contrast to the more simple incompressible simulation models appropriate for lower velocities and thus in particular for smaller passenger airplanes. This means that pressure and temperature are variables in the airflow and that local areas with air velocities above 1 Mach appear which is called a transsonic flow. The total weight of the aircraft is about 70 tons. A typical angle of attack alpha is 1.7° for the main wing end in in-flight shape. This value is illustrated in FIG. 2 and relates to the angle between the chord line of the main wing at its tip end to the actual flight direction. It has been determined by variation of this angle and calculation of the resultant overall lifting force of the two main wings. When they equal the required 70 to, the mentioned value is approximately correct.

In this mapping, a certain parameter set, subsequently named V0040, has been chosen as an optimum and has been the basis for the following more detailed comparisons.

The gamma and delta values of winglets 8 and 9 ("finger 1 and finger 2") are listed in table I which shows that first winglet 8 has a gamma of −10° and a delta of −20° (the negative priority meaning an anti-clockwise rotation with regard to FIGS. 7 and 8) whereas second winglet 9 has a gamma of −5° and a delta of −10°. Starting therefrom, in the third and fourth line of table I, gamma of the first winglet 8 has been decreased and increased by 2°, respectively, and in the fifth and sixth lines, delta of first winglet 8 has been decreased and increased by 10°, respectively. The following four lines repeat the same schedule for second winglet 9. For comparison, the first line relates to a main wing without winglet (and without fence). In the column left from the already mentioned values of gamma and delta, the numbers of the simulations are listed. V0040 is the second one.

From the sixth column on, that is right from the gamma and delta values, the simulation results are shown, namely the X-directed force on an outward section of the main wing (drag) in N (Newton as all other forces). In the seventh column, the Z-directed force (lift) on this outward section is shown. The outward section is defined starting from a borderline approximately 4.3 m inward of the main wing tip. It is used in these simulations because this outward section shows clear influence of the winglets whereas the inward section and the base body do not.

The following four columns show the drag and the lift for both winglets ("finger 1 and 2" being the first and second winglet). Please note that the data for "finger 1" in the first line relates to a so-called wing tip (in German: Randbogen) which is a structure between an outward interface of the main wing and the already mentioned fence structure. This wing tip is more or less a somewhat rounded outer wing end and has been treated as a "first winglet" here to make a fair comparison. It is substituted by the winglets according to the invention which are mounted to the same interface.

The following column shows the complete lift/drag ratio of the wing including the outward and the inward section as well as the winglets (with the exception of the first line).

The next column is the reduction achieved by the two winglets in the various configurations with regard to the drag ("delta X-force") and the respective relative value is in the next-to-last column.

Finally, the relative lift/drag ratio improvement is shown. Please note that table I comprises rounded values whereas the calculations have been done by the exact values which explains some small inconsistencies when checking the numbers in table I.

It can easily be seen that V0040 must be near a local optimum since the drag reduction and the lift drag ratio improvement of 2.72% and 6.31%, respectively, are with the best results in the complete table. The small decrease of gamma of the first winglet 8 (from −10 to −8) leads to the results in the fourth line (V0090) which are even a little bit better. The same applies to a decrease of delta of the second winglet 9 from −10° to 0°, compare V0093 in the next-to-last line. Further, a reduction of delta of the first winglet 8 from −20° to −30° leaves the results almost unchanged, compare V0091. However, all other results are more or less remarkably worse.

FIG. 12 shows a side view in the perspective of FIG. 11 but with the two winglets added to the main wing in FIG. 11 and, additionally, with two hatched lines for later reference (reference lines for air velocity angle) and FIG. 13 shows a plan view onto the main wing tip and the two winglets with the same reference lines as in FIG. 12. Both reference lines are upstream of the respective leading edge of the winglet by 10 cm and are parallel to said leading edge.

Figure 14:
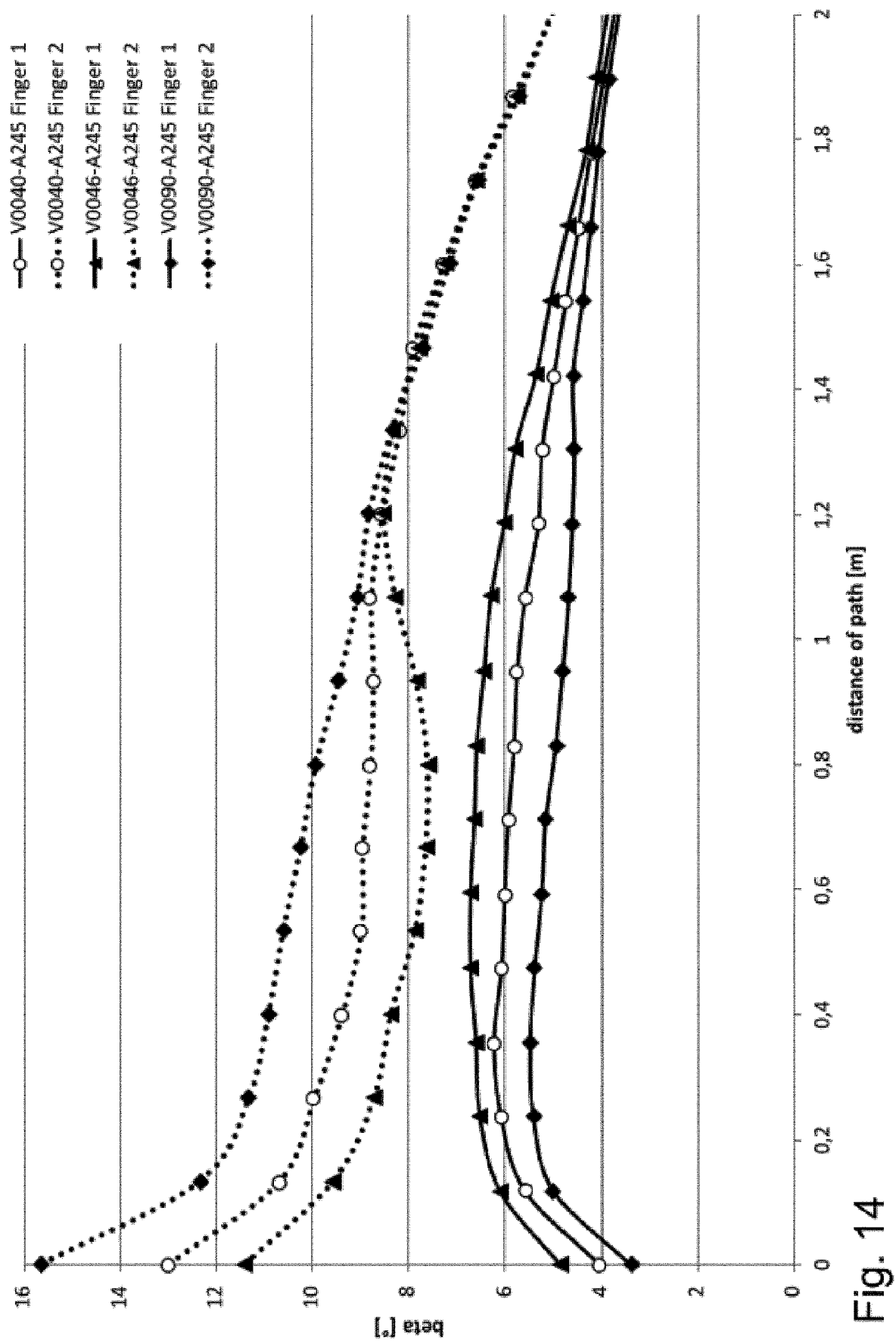

FIG. 14 is a diagram comparable to FIG. 6, namely showing the angle beta on the vertical axis and the distance from the main wing tip along the reference lines just explained. The basic parameter set and simulation V0040 is represented by circles, V0046 is represented by triangles, and V0090 is represented by diamonds. The solid lines relate to the reference line upstream of the first winglet 8 and the dotted lines to the other one, upstream of the second winglet 9 and downstream of the first winglet 8. Table I clarifies that V0046 has a reduced gamma of the first winglet 8 and V0090 an increased gamma of the first winglet 8 with a step size 2°.

First of all, the graphs show that the first winglet 8 produces a significantly "broadened" vortex region, even upstream of the first winglet 8 as shown by the solid lines. In contrast to FIG. 6, there is no pronounced second maximum (18 in FIG. 6) but a more or less constant beta angle between 0.5 m and about 1.2 m. The respective length of the main wing is 16.35 m which means for example an eta of 1.031 for 1.5 m and of 1.07 for 1.2 m, approximately (compare FIG. 6).

This beta value is in the region of 9° which is in the region of 70% of the maximum at 0° (both for the reference line between both winglets, i. e. the dotted graph). Further, with the reduced gamma value, V0046 (triangles) shows an increased beta upstream of the first winglet 8 and a decreased beta downstream thereof.

Contrary to that, with increased gamma, V0090 shows an increased beta downstream of the first winglet 8 and a decreased beta upstream thereof. Thus, the inclination gamma (angle of incidence) can enhance the upwards tendency of the airflow in between the winglets, in particular for places closer to the main wing tip than 1 m, compare FIG. 14. In this case, the beta values above a distance of 1 m are not deteriorated thereby. The results in table I show, that the overall performance of this parameter set is even a little bit better than V0040. This is obviously due to a reduced overall drag (although the angle of incidence has been increased), i. e. by a stronger contribution to the overall thrust.

On the other hand, a reduction of the gamma value from 10° to 8° and thus from V0040 to V0046 clearly leads to substantially deteriorated results, compare table I. Consequently, in a further step of optimization, gamma values higher, but not smaller than 10° and possibly even a little bit smaller than 12° could be analyzed.

Figure 15:
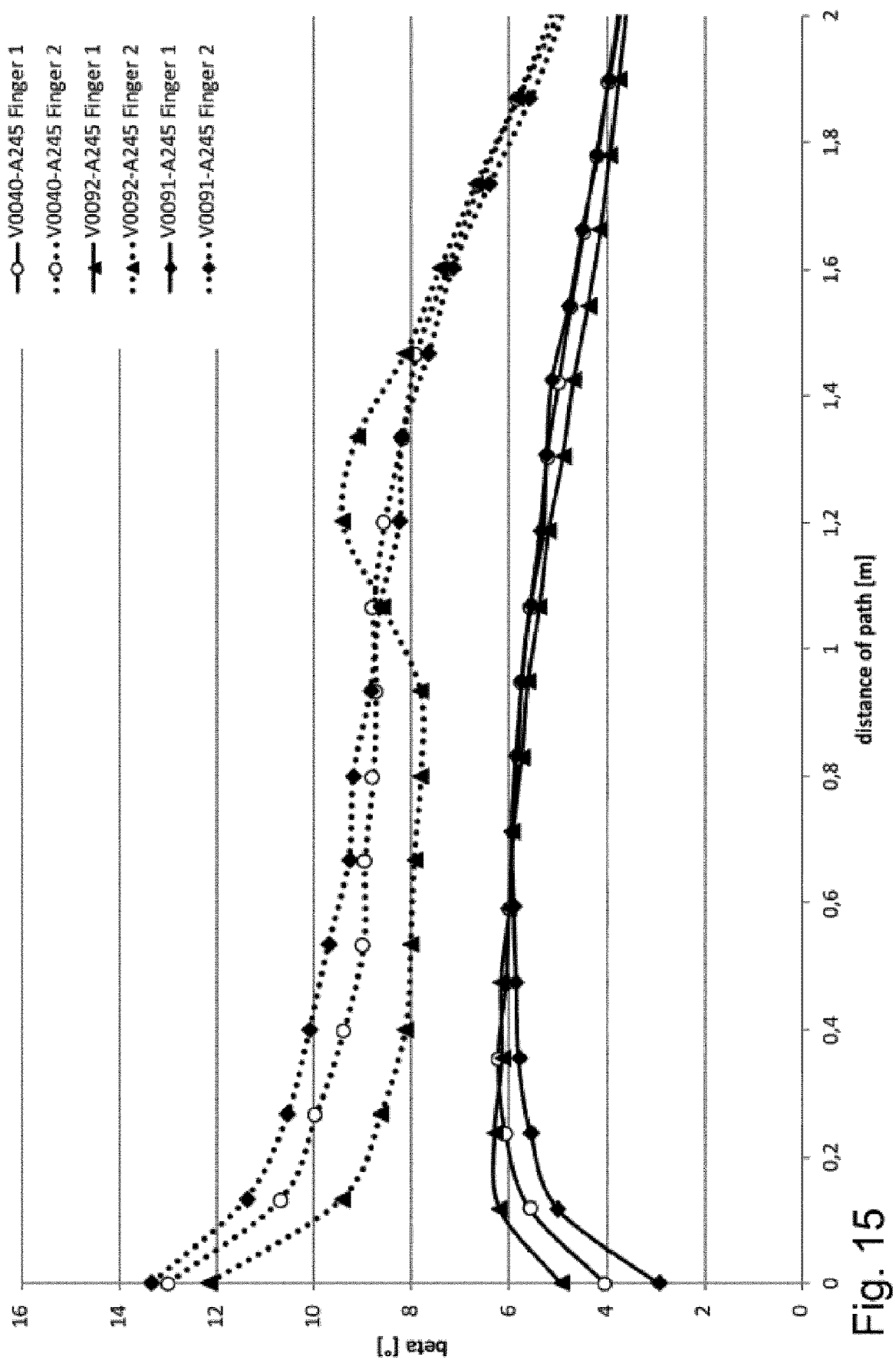

Further, FIG. 15 shows an analogous diagram, but for V0040 in comparison to V0092 and V0091. Here, the angle delta of the first winglet 8 has been varied from −20° to −10° and to −30°, compare table I and FIG. 8. Obviously, this has little impact on the air velocity angle (beta) distribution upstream of the first winglet 8 (solid lines) but it has an impact on the airstream angles downstream thereof (dotted lines). Again, the beta values increase a little bit for distances below 1 m by increasing the delta value, namely for V0091. The respective performance results in table I are almost identical with those of V0040 and obviously the beta values in FIG. 15 as well.

On the other hand, decreasing the delta value to −10 and thus bringing both winglets in line (as seen in the flight direction) qualitatively changes the dotted graph in FIG. 15. The beta values are reduced up to about 1 m, namely the length of the first winglet 8, and are clearly increased above that distance value. Seemingly, the second winglet 9 is somewhat in the lee of the first winglet 8 up to 1 m and "sees" the winglet tip vortex thereof at distances above 1 m. In summary, this does not improve the results but leads to some deterioration, as table I shows. The inventors assume that the beta increase at distances above 1 m does not compensate for the beta decrease at smaller distances.

Figure 16:
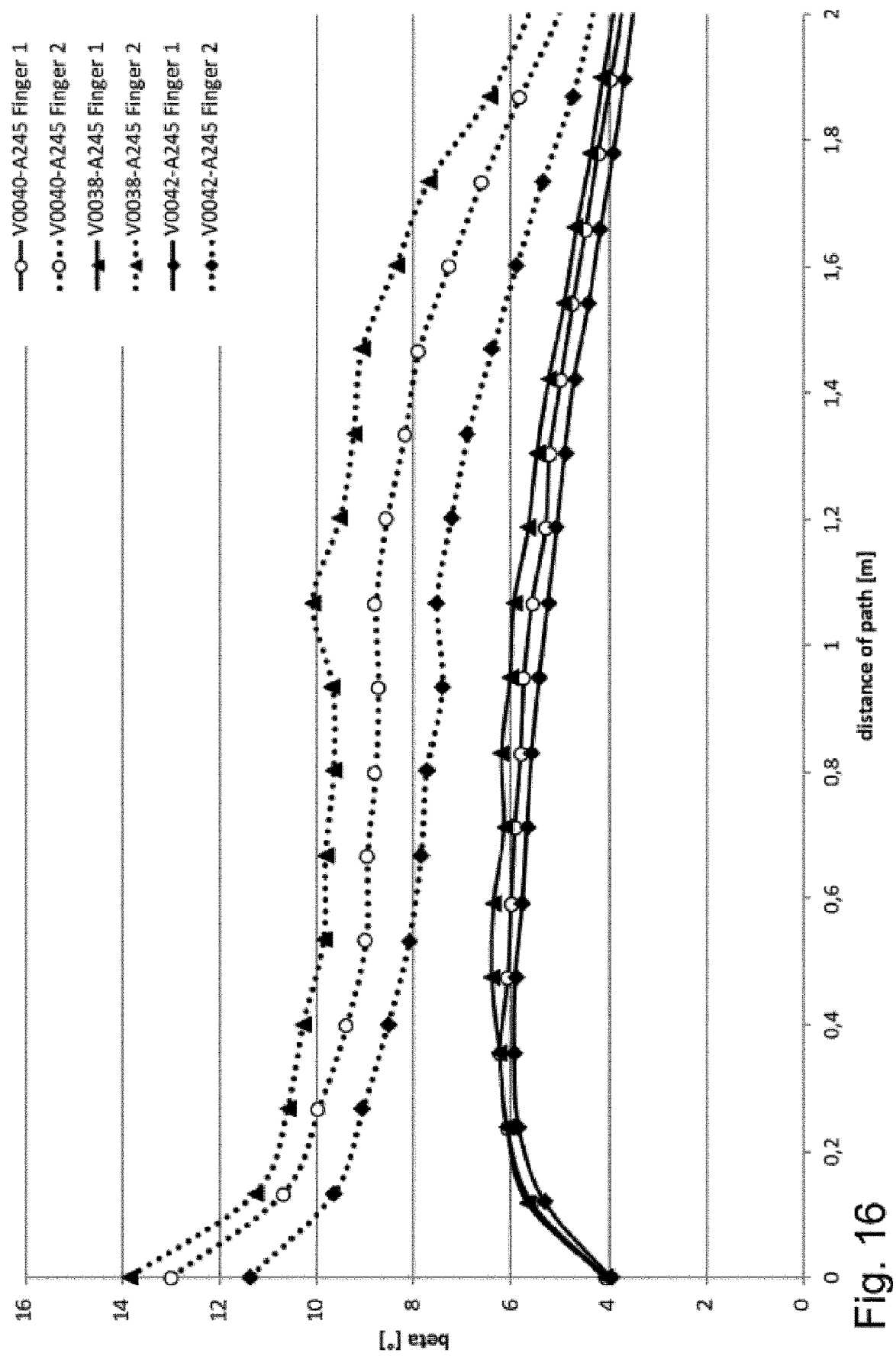

FIG. 16 shows another analogous diagram, now relating to a variation of the gamma angle of the second winglet 9. Again, this obviously has not much impact on the beta values upstream of the first winglet 8 (solid lines), but has a substantial impact on the beta values in between both winglets (dotted lines). Here, the beta values increase with a small decrease of gamma from 5° to 3° and, in the opposite, they decrease with an increase of gamma from 5° to 7°. In a similar manner as the solid lines in FIG. 14, a turning into the airstream of the winglet obviously decreases the inclination of the airstream upstream of the winglet. The results in table I clearly show that both variations, V0038 and V0042 decrease the performance results. In particular, the reduction of beta between both winglets by an increase of gamma of the second winglet 9 substantially deteriorates the lift/drag improvement. Further, a too strong inclination of the winglet does produce more lift but also produces over-proportionally more drag and thus leads to a deterioration.

Obviously, with a next step of optimization, the gamma value of the downstream winglets should be left at 5°.

Figure 17:
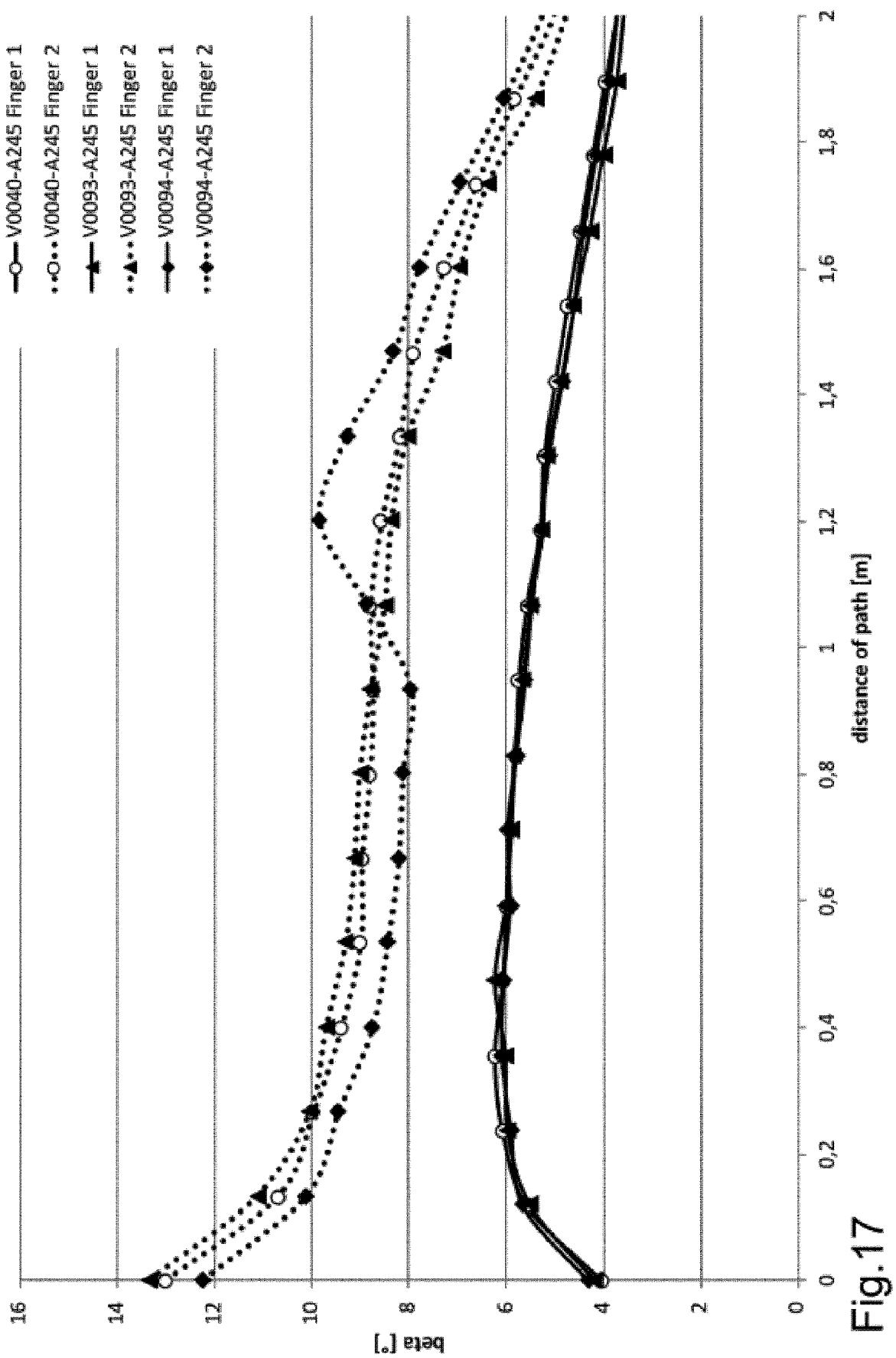

Finally, FIG. 17 relates to a variation of the delta angle of the second winglet 9 and leads to similar results as FIG. 15: for V0094, the delta values of both winglets are −20° and again the second 9 winglet seems to be in the lee of the upstream winglet and shows a strong impact by the winglet tip vortex thereof which leads to comparatively bad results, in particular with regard to the lift drag ratio. Increasing the delta difference between both winglets by V0093 does not change much in the beta values and leads to similar (somewhat improved) results in table I. Again, with a next step of optimization, the range of delta for the second winglet 9 between 0° and −10° is interesting.

On the basis of the above results, further investigations with three winglets and again based on what has been explained above in relation to the A320 have been conducted. Since the number of simulations feasible in total is limited, the inventors concentrated on what has been found for two winglets. Consequently, based on the comparable results with regard to the drag reduction of more than 2.7 and the lift/drag ratio for the complete wing (compare the fourth-last and second-last column in table I), the parameters underlying V0040, V0090, V0091, and V0093 were considered in particular. Consequently, simulations with varying values for the angle of incidence gamma and the dihedral angle delta of the third winglet were performed on the basis of these four parameter sets and were evaluated in a similar manner as explained above for the first and second winglet.

Simultaneously, data with regard to the in-flight shape of the main wing of the A320 were available with the main impact that the chord line at the wing end of the main wing is rotated from the so-called jig shape underlying the calculations explained above by about 1.5°. This can be seen by the slightly amended gamma values explained below. Still further, data relating to the drag of the complete airplane for different inclinations thereof were available, then, so that the impact of an improvement of the overall lift (by a lift contribution of the winglets as well as by an increase of the lift of the main wing due to a limitation of the vortex-induced losses) on the overall drag due to a variation of the inclination of the airplane could be assessed.

The results (not shown here in detail) showed that the V0091 basis proved favourable. The respective embodiment will be explained hereunder.

FIG. 18 shows a front view of the winglets 8, 9, 10 of this embodiment as seen in the x-direction and illustrates the dihedral angles delta 1, 2, 3 of the three winglets. The upper most winglet is the first one, the middle winglet is the second one, and the lowest winglet is the third downstream one. FIG. 18 shows qualitatively, that a substantial, but limited relative dihedral angle between the succeeding winglets has proven to be advantageous also for the three winglet embodiment.

Taking this opportunity, FIG. 19 explains the definition of a relative dihedral angle. In the same perspective as FIG. 18, the first and the second winglet are shown together with two radii r1 and r2 of different size. The meeting point of a vertical and the horizontal line is the root R (at the splitting point horizontally and the meeting of the leading edges vertically) and one vertex of an isosceles triangle shown, the other two vertices of which are on the leading edges of the two winglets and referred as V1 and V2. The angle between the line R-V1 and the line R-V2 is the relative dihedral angle if taken as an average over all radii ri possible within the shorter one of the two winglets, namely the first one.

The visible difference between the line R-V1 from the leading edge of the first winglet is connected to the bending of the first winglet to be explained hereunder which is also the background of the deviation between the line for delta 1 and the first winglet in FIG. 18.

In this connection, the inventors have found that average relative dihedral angles in this sense from 5° to 35° with more preferred lower limits of 7°, 9°, 11°, 13° and 15° and more preferred upper limits of 33°, 31°, 29°, 27°, and 25°, are preferred both with regard to the first and second winglets and to the second and third winglets (if any) in a general sense and also independently of the embodiments. A certain synergy between the winglets can be upheld whereas a too much "in the lee" position of a downstream winglet can be avoided.

FIG. 20 illustrates the above mentioned bending of the first winglet which is so to say a distribution of a part of the dihedral angle along a certain portion of the spanwise length. Actually, in FIG. 20, a leading edge L is schematically shown to start from a root R and to be bent along a circular arch shape B extending over one third (330 mm) of its length with a radius of 750 mm and an arch angle of −15°. Already at the start of R the leading edge of the first winglet has a dihedral angle of −20°. This means that outwards of the bending, the dihedral angle for the second and third third of the length of the first winglet is actually −35°. In an average along the complete spanwise length of the first winglet from R to its outward end, an average dihedral angle of about −30° results, −15° of which have been "distributed" along the arch as described.

The reason is that in this particular embodiment, a straight leading edge of the first winglet with a dihedral angle of −30° has made it somewhat difficult to provide for a smooth transition of a leading edge to that one of the main wing end (in the so-called fairing region) whereas with −20° dihedral angle, the smooth transition has not caused any problems. Therefore, in order to enable an average value of −30°, the solution of FIG. 20 has been chosen.

In general, it is within the teaching of this invention to use winglet shapes that are not straight along the spanwise direction such as shown in FIG. 20. They could even be arch shaped along the complete length as pointed out before. What is most relevant in the view of the inventors, is the relative dihedral angle in an average sense. If for example, a first and a second winglet would both be arch shaped in a similar manner so that the isosceles triangle construction explained earlier with a fixed vertex at the root would be inclined more and more with increasing length of the equal sides thereof due to the curvature of the winglet leading edges, the relative dihedral angle according to this construction might even remain almost constant along the leading edges. Still, at a certain portion along the spanwise length of, for example the second winglet, the proximate portion along the spanwise length of the first winglet would be positioned relative to the second winglet in a manner that is well described by the relative dihedral angle (remember the somewhat rotationally symmetrical shape of the vortex at the wing end) and is well described by the triangle construction.

The absolute dihedral angles of the second and the third winglet in this embodiment are delta $2=-10°$ and delta $3=+10°$ wherein these two winglets of this embodiment do not have an arch shape as explained along FIG. 20. Consequently, the relative dihedral angle between the first and the second winglet is 20°, is the same as the relative dihedral angle between the second and the third winglet, and the first winglet is more upwardly inclined than the second winglet, the second winglet being more upwardly inclined than the third winglet, compare FIG. 18. The angle delta 1 shown in FIG. 18 is the starting dihedral angle at the root of the first winglet, namely −20° instead of the average value of −30°.

As regards the angles of incidence, reference is made to FIG. 21 showing a side view and sections through the three winglets 8, 9, 10, and the main wing 2. The sectional planes are different, naturally, namely 10% outward of the spanwise length of the winglets from the respective splitting positions, and 10% inward in case of the main wing 2, to provide for undisturbed chord lines. The chord lines and the respective angles gamma 1, 2, 3 are shown in FIG. 21. The angles are gamma $1=-9°$ for the first winglet, gamma $2=-4°$ for the second winglet and gamma $3=-1°$ for the third winglet, all being defined relative to the main wing chord line at the described outward position and in the in-flight shape of the winglets and of the main wing (all parameters explained for this embodiment relating to the in-flight shape).

FIG. 21 also shows the respective rotating points on the chord line of main wing 2 as well as on the chord line of the respective winglet 8, 9, 10. In terms of the respective chord line length of the winglets, the rotating points are approximately at a third thereof. In terms of the chord line length of main wing 2, the rotating point of the first winglet is at 16.7% (0% being the front most point on the chord line), the rotating point of the second winglet is at 54.8%, and the rotating point of the third winglet is at 88.1%.

FIG. 22 illustrates the sweepback angle epsilon of a representative winglet 9, namely the angle between the leading edge thereof and a direction (y in FIG. 22) being horizontal and perpendicular to the flight direction. Herein, winglet 9 is thought to be horizontal (delta and gamma being zero in a fictious manner). alternatively, the spanwise length of winglet 9 could be used instead of its actual extension in the y-direction when being projected onto a horizontal plane. Please note that also the arch shape of winglet 8 as explained along FIG. 22 would be regarded to be unrolled. In other words, the spanwise length includes the length of the arch.

In the present embodiment, the sweepback angle of the main wing 2 is 27.5°. Variations starting from this value showed that an increased sweepback angle of 32° is preferable for the winglets, in other words 4.5° sweepback angle relative to the main wing's sweepback angle. This applies for the second and for the third winglets 9, 10 in this embodiment whereas for the first winglet 8, the sweepback angle has been increased slightly to 34° in order to preserve a certain distance in the x-direction to the leading edge of the second winglet 9, compare the top view in FIG. 25 explained below.

FIG. 23 is a fictious top view onto the three winglets 8, 9, 10, to explain their shape. It is fictious because the dihedral angles and the angles of incidence are zero in FIG. 23 and the arch shape of the first winglet 8 is unrolled. FIG. 23, thus, shows the respective spanwise length b1, 2, 3. It further shows the chord line lengths cr1, 2, 3, at 10% of the spanwise length outward of the splitting points (these being at the bottom of FIG. 23) as well as the tip chord line lengths ct1, 2, 3, at 10% inward of the winglets' tips.

The actual values are (in the order first, second, third winglet): a root chord length cr of 0.4 m, 0.6 m, 0.4 m; a tip chord length ct of 0.3 m, 0.4 m, 0.25 m; a spanwise length b of 1 m, 1.5 m, 1.2 m. This corresponds to a root chord length cr of approximately 25% of the main wing chord length at its end (as defined), approximately 37% and approximately 25%; a tip chord length relative to the root chord length of 75%, 67% and 63%; and a spanwise length relative to the spanwise main wing length (16.4 m) of 6.1%, 9.2%, 7.3%, respectively.

Please note that the angle of sweepback as shown in FIG. 23 is no rotating operation result. This can be seen in that the chord line lengths cr and ct remain unchanged and remain in the x-z-plane, in other words horizontal in FIG. 23. This is necessary in order not to disturb the airfoil by the introduction of the sweepback angle.

Still further, FIG. 23 shows a rounding of the respective outer forward corner of the winglets' shape. This rounding relates to the region between 90% and 100% of the spanwise length wherein the chord line length is continuously reduced from 90% to 100% spanwise length by 50% of the chord line length such that in the top view of FIG. 23 an arch shape is generated. It is common practice to use roundings at the outer forward corners of wings to avoid turbulences at sharp corner shapes. By the just explained reduction of the chord line length in the outer 10% of the spanwise length, the qualitative nature of the airfoil can be preserved.

The airfoil used here is adapted to the transonic conditions at the main wing of the A320 at its typical travel velocity and travel altitude and is named RAE 5214. As just explained this airfoil is still valid in the outer 10% of the spanwise length of the winglets.

Still further, this trailing edge (opposite to the leading edge) of the winglets is blunt for manufacturing and stability reasons by cutting it at 98% of the respective chord line length for all winglets.

The transformation of the shapes shown in FIG. 23 to the actual 3D geometry is as follows: first, the sweepback angles are introduced which are already shown in FIG. 23. Second, the bending of the first winglet along the inner third of its spanwise length with the radius of 750 mm and the angle of 15° is introduced. Then, the winglets are inclined by a rotation by the angle of incidence gamma. Then, the dihedral angles are adjusted, namely by inclining the first winglet by 20° upwardly (further 15° being in the bending), the second winglet by 10° upwardly and the third winglet by 10° downwardly.

Please note that the above transformation procedure does not relate to the jig shape and to the geometry as manufactured which is slightly different and depends on the elastic properties of the main wing and the winglets. These elastic properties are subject of the mechanical structure of the wing and the winglets which is not part of the present invention and can be very different from case to case. It is, however, common practice for the mechanical engineer to predict mechanical deformations under aerodynamic loads by for example finite elements calculations. One example for a practical computer program is NASTRAN.

Thus, depending on the actual implementation, the jig shape can vary although the in-flight shape might not change. It is, naturally, the in-flight shape that is responsible for the aerodynamic performance and the economic advantages of the invention.

Table II shows some quantitative results of the three winglet embodiment just explained (P0001). It is compared to the A320 without the invention, but, in contrast to table I, including the so-called fence. This fence is a winglet-like structure and omitting the fence, as in table I, relates to the improvements by the addition of a (two) winglet construction according to the invention to a winglet-free airplane whereas table II shows the improvements of the invention, namely its three winglet embodiment, in relation to the actual A320 as used in practice including the fence. This is named B0001.

The lift to drag ratios for both cases are shown (L/D) in the second and third column and the relative improvement of the invention is shown as a percentage value in the forth column. This is the case for six different overall masses of the airplane between 55 t and 80 t whereas table I relates to 70 t, only. The differences between the masses are mainly due to the tank contents and thus the travel distance.

Table II clearly shows that the lift to drag improvement by the invention relative to the actual A320 is between almost 2% in a light case and almost 5% in a heavy case. This shows that the invention is the more effective the more pronounced the vortex produced by the main wing is (in the heavy case, the required lift is much larger, naturally). In comparison to table I, the lift to drag ratio improvements are smaller (around 6.3% for the best cases in table I). This is due to the positive effect of the conventional fence included in table II and to the in-flight deformation of the main wing, namely a certain twist of the main wing which reduces the vortex to a certain extend. For a typical case of 70 t, the drag reduction of an A320 including the three winglet embodiment of the invention compared to the conventional A320 including fence is about 4% (wing only) and 3% (complete airplane), presently. This improvement is mainly due to a thrust contribution of mainly the second winglet and also due to a limited lift contribution of the winglets and an improved lift of the main wing by means of a reduction of the vortex. As explained earlier, the lift contributions allow a smaller inclination of the complete airplane in travel flight condition and can thus be "transformed" into a drag reduction. The result is about 3% as just stated.

For illustration, FIGS. 24 to 27 show the 3D shape of the A320 and three winglets, namely a perspective view in FIG. 24 of the complete airplane, a top view onto the main wing end and the winglets in FIG. 25 (against the z-direction), a side view (in y-direction) in FIG. 26, and finally a front view (in x-direction) in FIG. 27.

The figures show smooth transitions in the fairing region between the main wing end and the winglets and also some thickening at the inward portion of the trailing edges of the first and second winglets. These structures are intuitive and meant to avoid turbulences.

TABLE I

| Run CFDC | Finger 1 γ | Finger 1 δ | Finger 2 γ | Finger 2 δ | Outboard section of wing X-Force (Sim) [N] | Outboard section of wing Z-Force (Sim) [N] | Finger 1 X-Force (Sim) [N] | Finger 1 Z-Force (Sim) [N] | Finger 2 X-Force (Sim) [N] | Finger 2 Z-Force (Sim) [N] | Complete wing Ratio Lift/Drag [—] | delta X-Force [N] | drag reduction [%] | Ratio Lift/Drag improvement [%] |
|---|---|---|---|---|---|---|---|---|---|---|---|---|---|---|
| V204b_L02 | | | | | 839 | 68862 | −38 | 6331 | 0 | 0 | 22.9 | | | |
| V0040_A245_L02 | −10 | −20 | −05 | −10 | 730 | 67992 | −160 | 1805 | −244 | 4653 | 24.4 | −476 | −2.72 | 6.31 |
| V0046_A245_L02 | −08 | −20 | −05 | −10 | 731 | 68172 | −151 | 2339 | −200 | 4202 | 24.3 | −422 | −2.41 | 5.91 |
| V0090_A245_L02 | −12 | −20 | −05 | −10 | 733 | 67839 | −137 | 1230 | −281 | 5135 | 24.4 | −486 | −2.78 | 6.32 |
| V0092_A245_L02 | −10 | −10 | −05 | −10 | 719 | 67718 | −162 | 1748 | −223 | 4632 | 24.3 | −469 | −2.68 | 6.16 |
| V0091_A245_L02 | −10 | −30 | −05 | −10 | 743 | 68214 | −150 | 1716 | −266 | 4741 | 24.4 | −475 | −2.71 | 6.32 |
| V0038_A245_L02 | −10 | −20 | −03 | −10 | 753 | 68711 | −173 | 1916 | −146 | 5931 | 24.3 | −368 | −2.10 | 6.09 |
| V0042_A245_L02 | −10 | −20 | −07 | −10 | 711 | 67221 | −150 | 1683 | −227 | 3272 | 24.2 | −468 | −2.67 | 5.44 |
| V0093_A245_L02 | −10 | −20 | −05 | +00 | 709 | 67910 | −146 | 1821 | −240 | 4594 | 24.4 | −479 | −2.73 | 6.34 |
| V0094_A245_L02 | −10 | −20 | −05 | −20 | 754 | 68031 | −165 | 1683 | −249 | 4576 | 24.3 | −461 | −2.64 | 5.96 |

TABLE II

P0001 vs B0001 - wing only

| m [t] | P0001 L/D | B0001 L/D | Ratio Lift/Drag improvement [%] |
|---|---|---|---|
| 55.0 | 27.7 | 27.1 | 1.9 |
| 60.0 | 27.1 | 26.3 | 2.8 |
| 65.0 | 25.8 | 24.9 | 3.5 |
| 70.0 | 24.1 | 23.1 | 4.1 |

TABLE II-continued

P0001 vs B0001 - wing only

| m [t] | P0001 L/D | B0001 L/D | Ratio Lift/Drag improvement [%] |
|---|---|---|---|
| 75.0 | 22.3 | 21.3 | 4.5 |
| 80.0 | 20.5 | 19.6 | 4.7 |

The invention claimed is:

1. A wing for an airplane having a spanwise wing length from a base body of said airplane towards an outer wing end, and at least three winglets on said outer wing end connected to said wing, wherein an upstream first winglet of said at least three winglets precedes a downstream second winglet of said at least three winglets, said second winglet preceding an even more downstream third winglet of said at least three winglets in a flight direction of said airplane, said first winglet being arranged to produce a winglet tip vortex airflow additionally to a wing tip vortex airflow produced by said wing, such that said winglet tip vortex airflow and said wing tip vortex airflow are superposed to a combined vortex airflow in a plane between said first winglet and said second winglet and perpendicular to the flight direction of the airplane, wherein said first winglet is arranged to broaden a region of said combined vortex airflow by means of said superposition, and wherein said second winglet is adapted to produce an aerodynamic lift having a positive thrust component ($F_{xn}$), in said combined vortex airflow.

2. The wing of claim 1, wherein an air velocity angle relative to said flight direction of said combined vortex air flow, dependent on a distance from a region of maximum air velocity angle at said outer wing end, has an intermediate maximum air velocity angle at a select distance from said outer wing end and does not fall to values of said air velocity angle below 25% of a smaller one of said maximum air velocity angle and said intermediate air velocity angle, and also not below 25% of a larger one of said maximum air velocity angle, between said intermediate maximum air velocity angle and said outer wing end maximum.

3. The wing of claim 1, wherein said first winglet has a length of between 3% and 8% of said wing length.

4. The wing of claim 1, wherein said first winglet has an aspect ratio of between 3 and 7.

5. The wing of claim 1, wherein said second winglet has an aspect ratio of between 3 and 7.

6. The wing of claim 1, wherein said second winglet has an asymmetric wing profile for increasing said thrust component.

7. The wing of claim 1, wherein said first and said second winglets have an upward orientation relative to said wing in said flight direction.

8. The wing of claim 1, wherein said second winglet has a spanwise length of between 105% and 180% of a spanwise length of said first winglet.

9. The wing of claim 1, wherein an air velocity angle relative to said flight direction of said combined vortex airflow, dependent on a distance from a region of a maximum air velocity angle at said outer wing end, maintains a value of at least 25% of said maximum air velocity angle up to a value of said distance of at least 5% of said spanwise wing length of said wing.

10. The wing of claim 1, wherein said first winglet is upwardly inclined relative to said second winglet and said second winglet is upwardly inclined relative to said third winglet.

11. The wing of claim 1, wherein said third winglet is adapted to produce a lift having a positive thrust component.

12. The wing of claim 1, wherein said third winglet has a length of between 60% and 120% of said second winglet which is upstream of said third winglet.

13. An airplane having:
two mutually opposed wings, each wing including a spanwise wing length from a base body of said airplane towards an outer wing end, and
at least three winglets on said outer wing end and connected to said wing,
wherein said at least three winglets comprise an upstream first winglet of said at least three winglets preceding a downstream second winglet of said at least three winglets, said second winglet preceding an even more downstream third winglet of said at least three winglets in a flight direction of said airplane,
said first winglet being arranged to produce a winglet tip vortex airflow additionally to a wing tip vortex airflow produced by said wing, such that said winglet tip vortex airflow and said wing tip vortex airflow are superposed to a combined vortex airflow in a plane between said first winglet and said second winglet and perpendicular to a flight direction of the airplane, and
wherein said first winglet is arranged to broaden a region of said combined vortex airflow by means of said superposition, and
wherein said second winglet is adapted to produce an aerodynamic lift having a positive thrust component ($F_{xn}$), in said combined vortex airflow.

14. A method comprising:
mounting to a wing end of an airplane, a part comprising at least three winglets, the at least two winglets comprising an upstream first winglet of said at least three winglets positioned to precede a downstream second winglet of said at least three winglets, said first winglet being arranged to produce a winglet tip vortex airflow additionally to a wing tip vortex airflow produced by said wing, such that said winglet tip vortex and said wing tip vortex airflow are superposed to a combined vortex airflow in a plane between said first winglet and said second winglet and perpendicular to a flight direction of the airplane, and
wherein said first winglet is arranged to broaden a region of said combined vortex airflow by means of said superposition, and
wherein said second winglet is adapted to produce an aerodynamic lift having a positive thrust component ($F_{xn}$), in said combined vortex airflow.

\* \* \* \* \*